US006010065A

United States Patent [19]

Ramachandran et al.

[11] Patent Number: 6,010,065

[45] **Date of Patent: *Jan. 4, 2000**

[54] SERVICE METHOD FOR AUTOMATED BANKING MACHINE

[75] Inventors: Natarajan Ramachandran, Uniontown; Gerald T. Sedlock, North Canton; Kim Raymond Lewis, Stow; Charles D. Price, III, Salem; Richard Calvin Lute, Jr., Mogadore, all of Ohio

[73] Assignee: Diebold, Incorporated, North Canton, Ohio

[ * ] Notice: This patent is subject to a terminal disclaimer.

[21] Appl. No.: 08/808,631

[22] Filed: Feb. 28, 1997

Related U.S. Application Data

[62] Division of application No. 08/529,960, Sep. 19, 1995, Pat. No. 5,642,922, which is a division of application No. 08/213,404, Mar. 15, 1994, Pat. No. 5,483,047.

[51] Int. Cl.[7] .......................... G06F 15/30

[52] U.S. Cl. .......................... 235/379; 902/30

[58] Field of Search .......................... 902/9, 30, 31; 235/379

[56] References Cited

U.S. PATENT DOCUMENTS

| | | | |
|---|---|---|---|
| 4,595,828 | 6/1986 | Lundblad | 235/379 |
| 4,612,864 | 9/1986 | Beck et al. | 902/31 X |
| 5,017,026 | 5/1991 | Takesako et al. | 235/379 X |
| 5,299,511 | 4/1994 | Dallman et al. | 312/311 X |
| 5,352,033 | 10/1994 | Gresham et al. | 108/50 X |
| 5,483,047 | 1/1996 | Ramachandran et al. | 235/379 |
| 5,642,922 | 7/1997 | Ramachandran et al. | 235/379 X |

FOREIGN PATENT DOCUMENTS

| | | |
|---|---|---|
| 5810268 | 7/1981 | Japan . |
| 2287689 | 4/1989 | Japan . |
| 334092 | 6/1989 | Japan . |

*Primary Examiner*—Donald Hajec
*Assistant Examiner*—Karl D. Frech
*Attorney, Agent, or Firm*—Ralph E. Jocke

[57] ABSTRACT

An automated banking machine (10) includes a housing (12) with a top assembly (40). Rollout trays (46) are mounted in the top assembly and have serviceable components supported thereon. Servicing is accomplished through method steps which include opening a service door (18) and separately extending and retracting the trays to render the serviceable components thereon accessible for servicing.

22 Claims, 28 Drawing Sheets

SERVICE METHOD FOR AUTOMATED BANKING MACHINE

CROSS REFERENCE TO RELATED APPLICATION

This Application is a Divisional application of our U.S. application Ser. No. 08/529,960 filed Sep. 19, 1995, now U.S. Pat. No. 5,642,922 which is a Divisional application of U.S. Ser. No. 08/213,404 filed Mar. 15, 1994, now U.S. Pat. No. 5,483,047.

TECHNICAL FIELD

This invention relates to automated teller machines. Specifically, this invention relates to a method of servicing an automated teller machine which includes serviceable components supported on independently movable trays arranged in generally side by side relation.

BACKGROUND ART

Automated teller machines (ATMs) are known in the prior art. Customers of financial institutions may perform banking transactions, make inquiries concerning the status of their accounts, pay bills and obtain other banking services using automated teller machines. Typically the customer uses a magnetically encoded card that is inserted into the machine. The customer also inputs a personal identification number that allows the automated teller machine to verify the customer's identity. After the customer has conducted their transactions, the customer's card is returned along with one or more receipts which document the transactions conducted.

There are a number of different types of automated teller machines (ATMs). Some automated teller machines are designed to be inside the wall of a bank and have their customer interface extending through the wall of the bank. This enables customers to conduct their transactions without entering the bank either in a walk-up or drive-up fashion. This type of configuration is known as a "through-the-wall" configuration.

Other ATM units are designed to be freestanding either in the lobby of a bank or other commercial establishment. In these cases the entire ATM unit is placed on the floor and made operable by appropriate cabling. The lobby type ATMs have the advantage that they are much easier to install than a through-the-wall type machine.

In the past, lobby ATM units and through-the-wall ATM units have generally been made specifically for the type of installation in which they will be used. This is because of the different environmental and security requirements for lobby and through-the-wall units. Although many of the components used in both types of units are the same, different components were necessary to meet the different operating conditions.

Another problem that has occurred in the prior art is that when an ATM is installed within a facility, there must not only be room for the device, but there must also be provided sufficient area surrounding the machine for servicing. This is because ATMs require periodic replenishment of currency and supplies such as receipt forms, removal of customer deposits that have been deposited in the machine and maintenance. To provide the necessary access for servicing, substantial space must be provided. This space is required to enable a service technician to swing open an access door and work on the components inside the ATM.

Significant space is also required for servicing an ATM because it is often unrealistic to service or repair components within the tight confines of the ATM enclosure. As a result, some components have been mounted on a chassis that can be slid out of the machine to better expose the components that require periodic servicing. Such chassis often occupy a substantial part of the overall width of the ATM enclosure. The service technician has generally been required to have access both behind and to the sides of the extended chassis to service the components thereon. As a result, in positioning the ATM enough surrounding space must be provided to enable the technician not only to extend any components to their service position but also to provide space for the technician to stand and move while conducting service operations.

The requirement of providing access space for servicing increases the amount of space required for an ATM installation. As a result, the housing for a through-the-wall ATM must be larger than might otherwise be desired. Likewise, lobby unit ATMs cannot be generally mounted flush against a wall or in line with other self-service machines. This means that the lobby ATM must be generally freestanding and requires surrounding unproductive floor space. In addition, the fact that persons could gain access to several sides of a lobby ATM unit increases the risk of attack by burglars as well as increases the opportunities for theft of the entire unit.

Thus, there exists a need for an ATM enclosure that minimizes the space required for servicing. There further exists a need for an ATM enclosure that can be used with both through-the-wall and lobby ATMs and which is configurable to be accessed by a service technician either from the front or from the back depending on the ATM configuration and the particular type of installation. There is further a need for a method of servicing components in such an ATM.

DISCLOSURE OF INVENTION

It is an object of the present invention to provide an automated teller machine that is more readily serviceable.

It is a further object of the present invention to provide an automated teller machine that requires less space for installation.

It is a further object of the present invention to provide an automated teller machine that requires less space for servicing.

It is a further object of the present invention to provide an automated teller machine that provides better access for servicing of internal components.

It is a further object of the present invention to provide an automated teller machine having an enclosure that can be configured for either front or rear access.

It is a further object of the present invention to provide an automated teller machine that can be readily configured either as a lobby unit or as a through-the-wall unit.

It is a further object of the present invention to provide an adjustable monitor mount for use in an ATM that is suitable for positioning a monitor in a plurality of configurations. It is a further object of the present invention to provide a method for servicing an automated teller machine.

Further objects of the present invention will be made apparent in the following Best Modes for Carrying Out Invention and the appended claims.

The foregoing objects are accomplished in the preferred embodiment of the invention by an automated teller machine having a generally rectangular enclosure which includes a pair of spaced side walls and a top wall. The enclosure has a front opening and a rear opening. The front opening of the enclosure has associated therewith a fascia which includes the customer interface for operating the automated teller machine.

The components comprising the automated teller machine are mounted in a pair of adjacent trays each of which extend approximately one-half the width of the enclosure between the side walls. The trays are extendible individually out of one of the openings so that the components thereon may be serviced.

The ATM enclosure may be configured for use with either a space saving front access lobby type unit or a space saving through-the-wall unit. In the lobby unit, the front fascia is pivoted at the top and may be opened to provide access to the interior of the unit through a front opening. In this configuration, the back opening to the unit is permanently closed by a panel. The service technician servicing, the lobby unit is enabled to stand on one side and extend the tray on the opposed side to service the components thereon. Thereafter, the technician may retract the extended back tray into the machine, move to the opposed side and extend the other tray.

To facilitate the technician's ability to work on the machine, the fascia panel includes an opening that normally provides viewing access to the screen, through which a technician can extend their head while servicing the components. As a result, the floor space for servicing the front access lobby unit is reduced. The machine may be positioned in tight quarters without impeding servicing.

In alternative installations such as a through-the-wall unit or where it is desirable to service the machine from the rear, the front fascia panel is permanently locked in place to close the front opening. The component trays are then arranged to extend from the rear of the machine which has a service door located thereon. The service door can be arranged to swing to the side or, alternatively, in an upward pivoting manner depending on the space constraints. A technician servicing the rear access machine is enabled to withdraw one of the trays from the enclosure at a time and stand on the opposed side to service the components on the extending tray. The technician may then retract the extending tray into the machine, move to that side and then extend the tray on the opposite side to work on those components.

The design of the ATM enclosure enables the technician to perform all the servicing functions while remaining in close proximity to the machine. As a result, the amount of space that must be provided around the ATM for servicing is minimized.

An adjustable monitor mount is supported on a base surface which is preferably on one of the trays. The monitor mount supports a monitor having a screen in aligned relation with the screen opening in the fascia when the fascia and monitor are in operating position.

The monitor mount includes a slide bracket that is supported on the base surface. The slide bracket is movable on a guide along a first direction which is aligned with the screen opening in the fascia. A pivot bracket is pivotally supported on the slide bracket. The pivot bracket enables tilting of the monitor to a desired angle to be in alignment with the fascia opening. A surround assembly is movably mounted adjacent to the screen of the monitor and is positionable to engage the fascia in gapless relation when in the operative position.

In a preferred form of the invention the tray supporting the monitor can be withdrawn from the interior area of the housing or enclosure of the machine to facilitate positioning of the monitor and surround assembly. The monitor may then be secured in the desired position using fasteners and locking brackets and returned to the interior area of the housing.

BEST MODES FOR CARRYING OUT INVENTION

Figure 1:
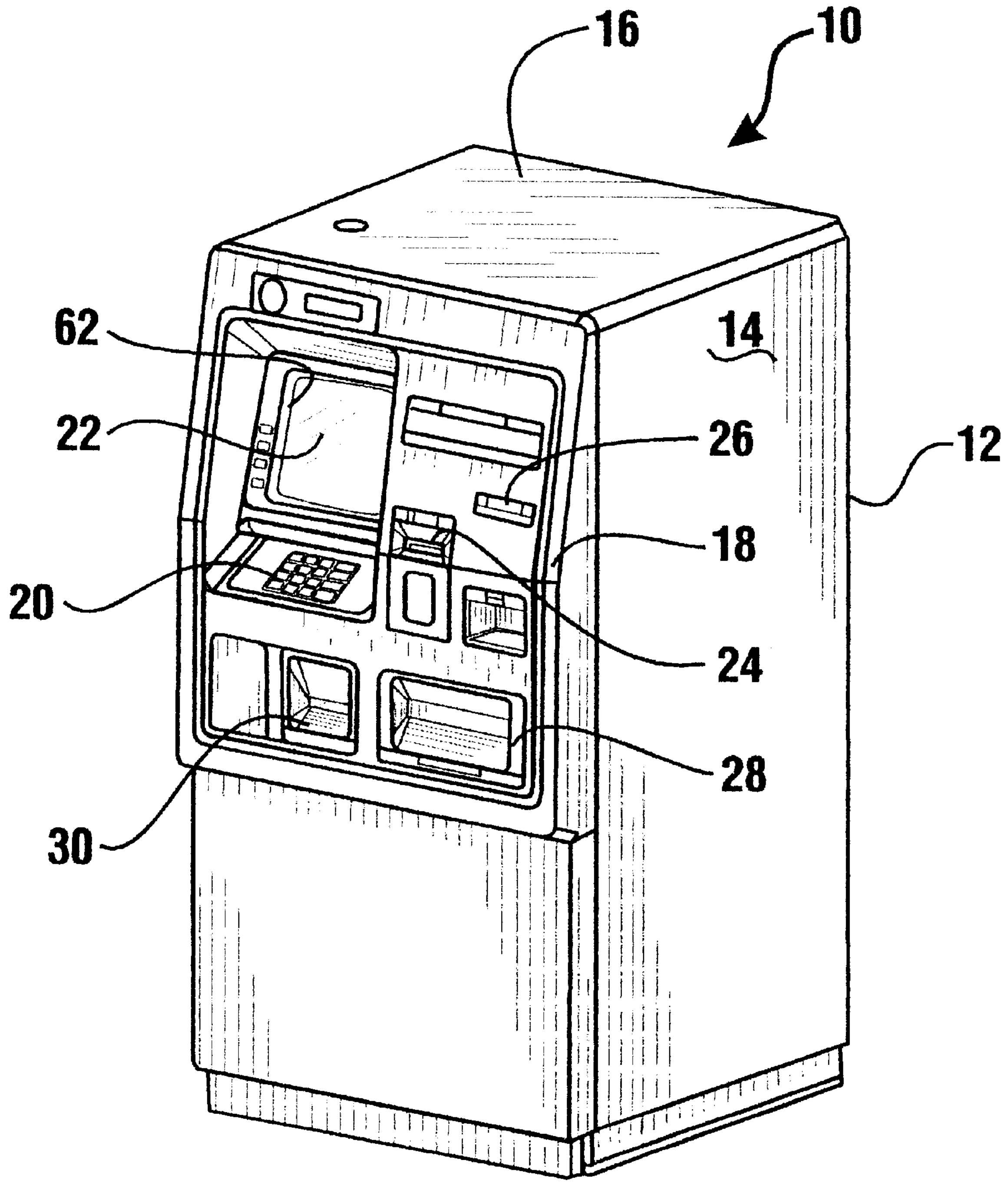
FIG. 1 is an isometric view of an automated teller machine designed for lobby use.

Referring now to the drawings and particularly to FIG. 1, there is shown therein an automated teller machine generally indicated 10. The ATM has a housing or enclosure 12 which includes a pair of spaced side walls 14 and a top wall 16. The ATM 10 further includes a front fascia panel 18 which includes the customer interface for the machine. Fascia panel 18 has extending thereon or accessible therethrough a keyboard 20, a monitor screen 22, a customer card accepting slot 24 and a receipt delivery opening 26. The ATM further includes a cash delivery door 28 as well as a deposit accepting opening 30. Of course, the fascia panel may have other openings and/or components accessible therethrough, such as a camera or a supply of depository envelopes.

The ATM 10 is a lobby installed unit which is freestanding within the confines of a bank, grocery store or other facility where customers may wish to conduct financial transactions or other types of transactions on an automated basis.

Figure 6:
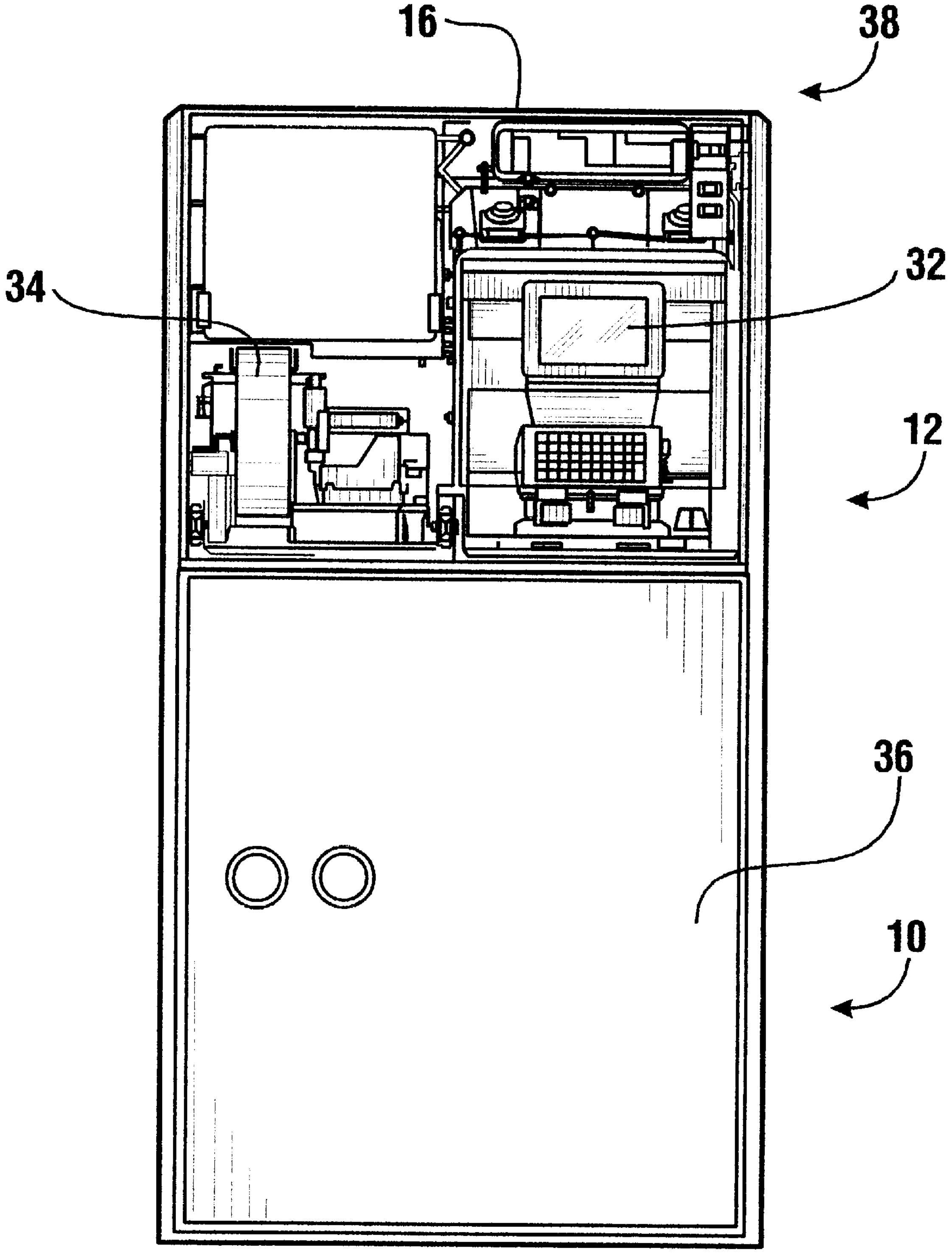
FIG. 6 is a back view of an automated teller machine with the rear opening of the enclosure open.
Figure 7:
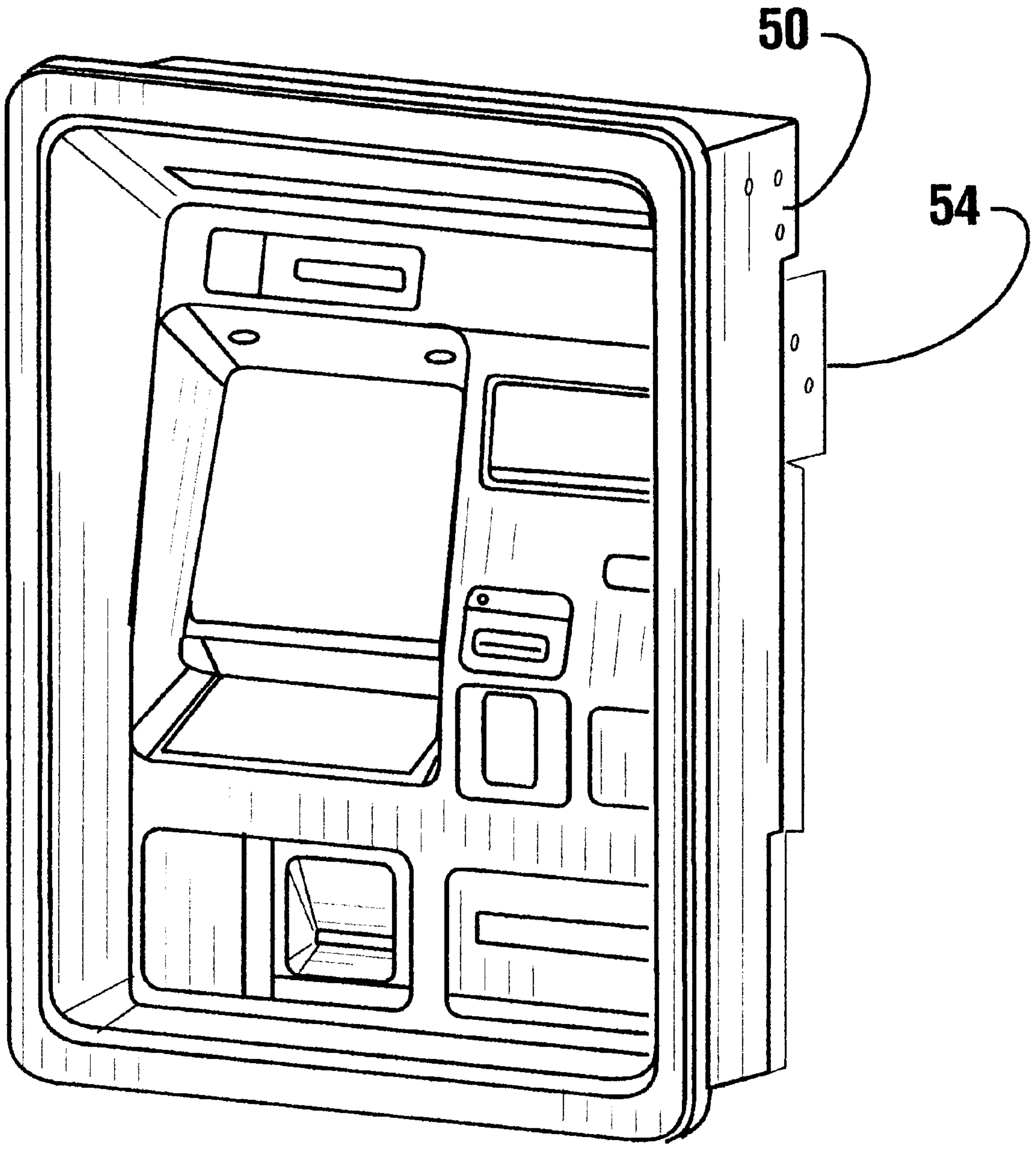
FIG. 7 is a front isometric view of a fascia panel for a through-the-wall mounted automated teller machine.
Figure 8:
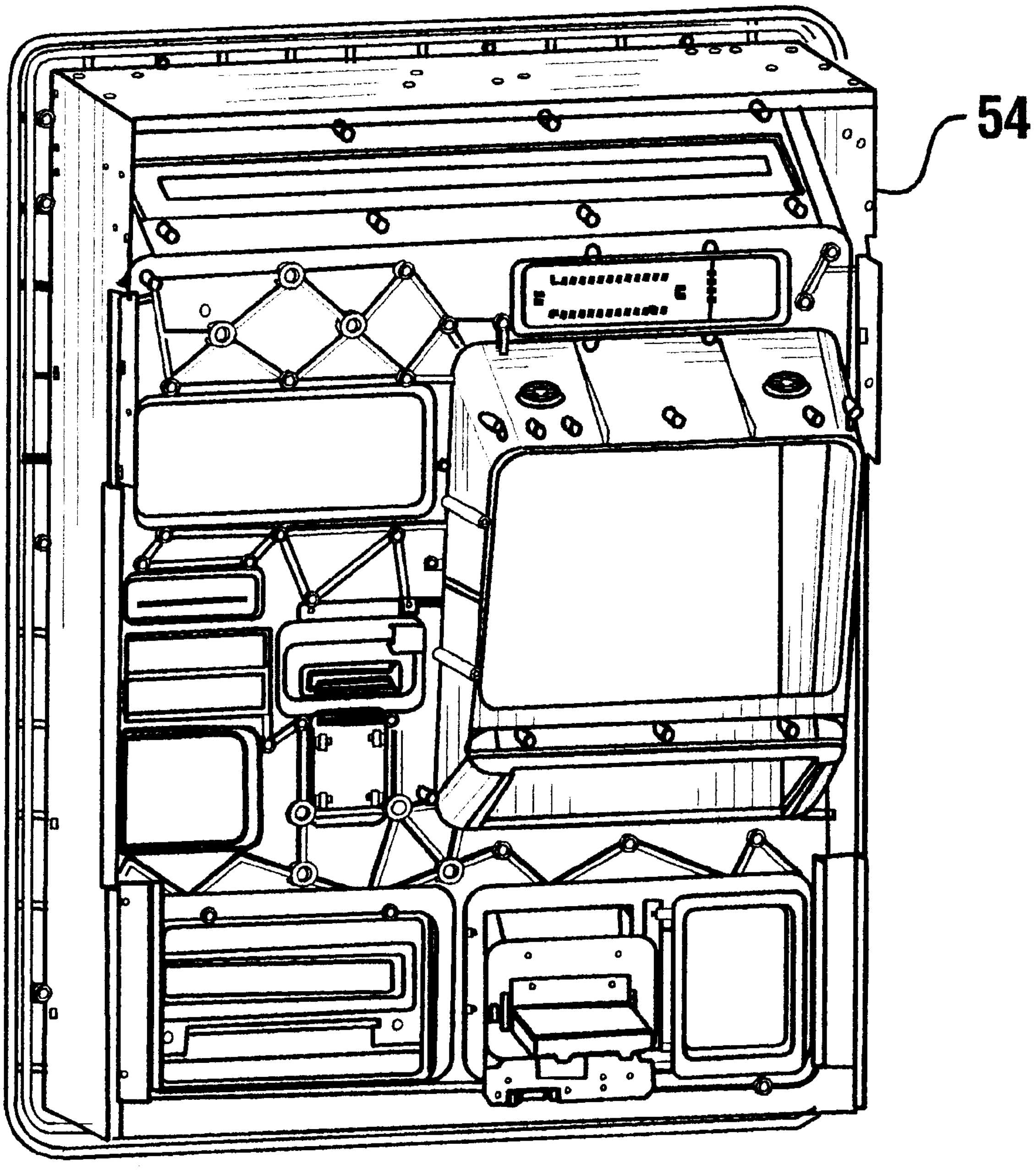
FIG. 8 is a back isometric view of the fascia panel shown in FIG. 7.
Figure 9:
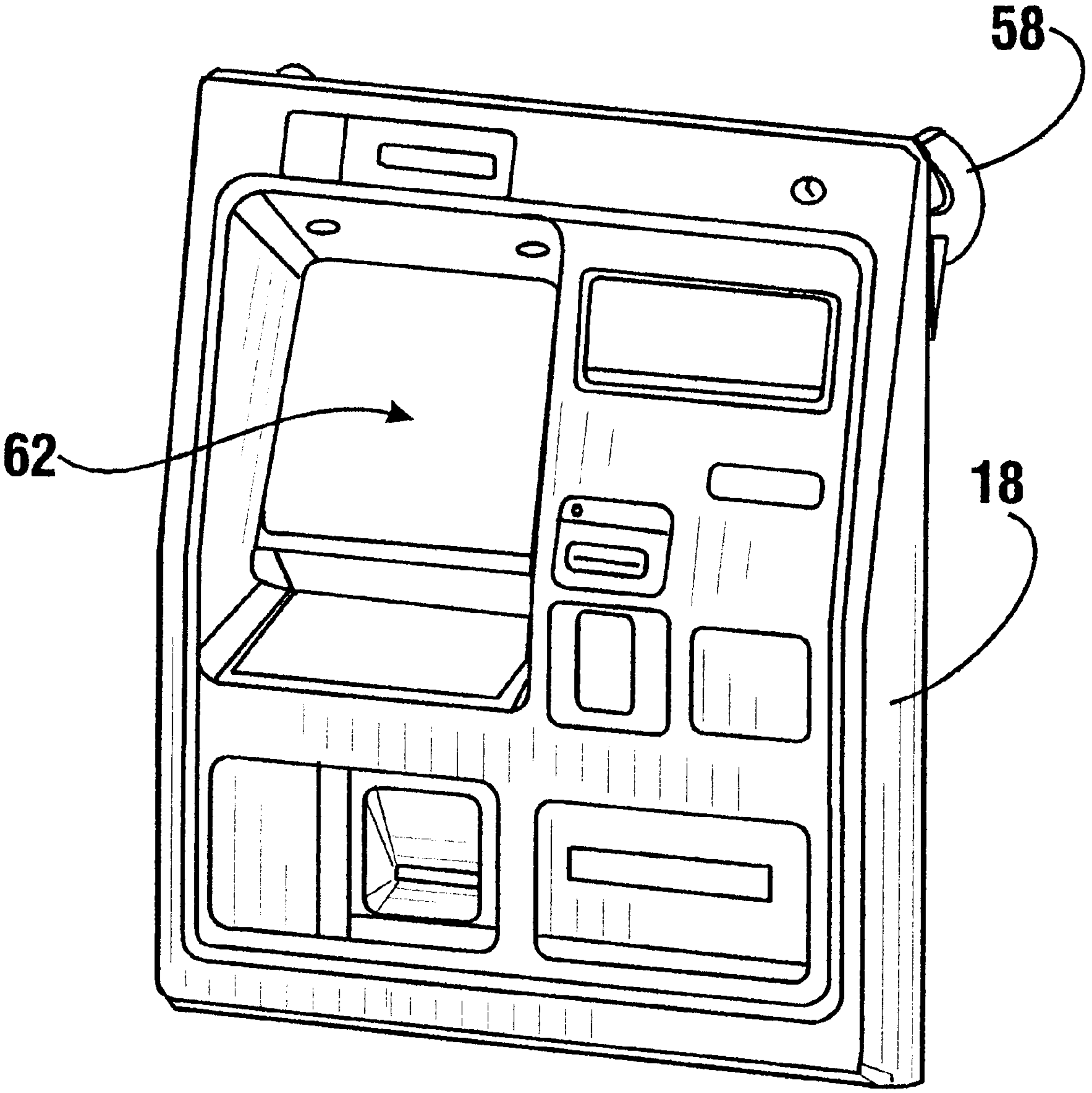
FIG. 9 is a front isometric view of a fascia panel for a lobby installed automated teller machine.

As best shown in FIG. 6, the housing or enclosure 12 of the ATM has a plurality of components mounted in its upper portion. These include a monitor 32 and a receipt and journal printer assembly 34 which are mounted in the upper part of the assembly. Of course, other components are mounted therein as well including a card reader and an internal enclosure for holding cards that a customer has attempted to use which are invalid or which have been reported stolen. A lower portion of the enclosure 36 is a secure chest which houses a supply of currency to be dispensed from the machine and the currency dispensing mechanism. The chest also has an apparatus which accepts and stores deposits made by customers who use the machine. The chest has its own access door thereto, which is generally a high security door. In the type of lobby ATM machine shown in FIG. 1, the back opening 38 shown in FIG. 6 would normally be permanently covered by a closure panel so that the components therein would not be visible.

Figure 5:
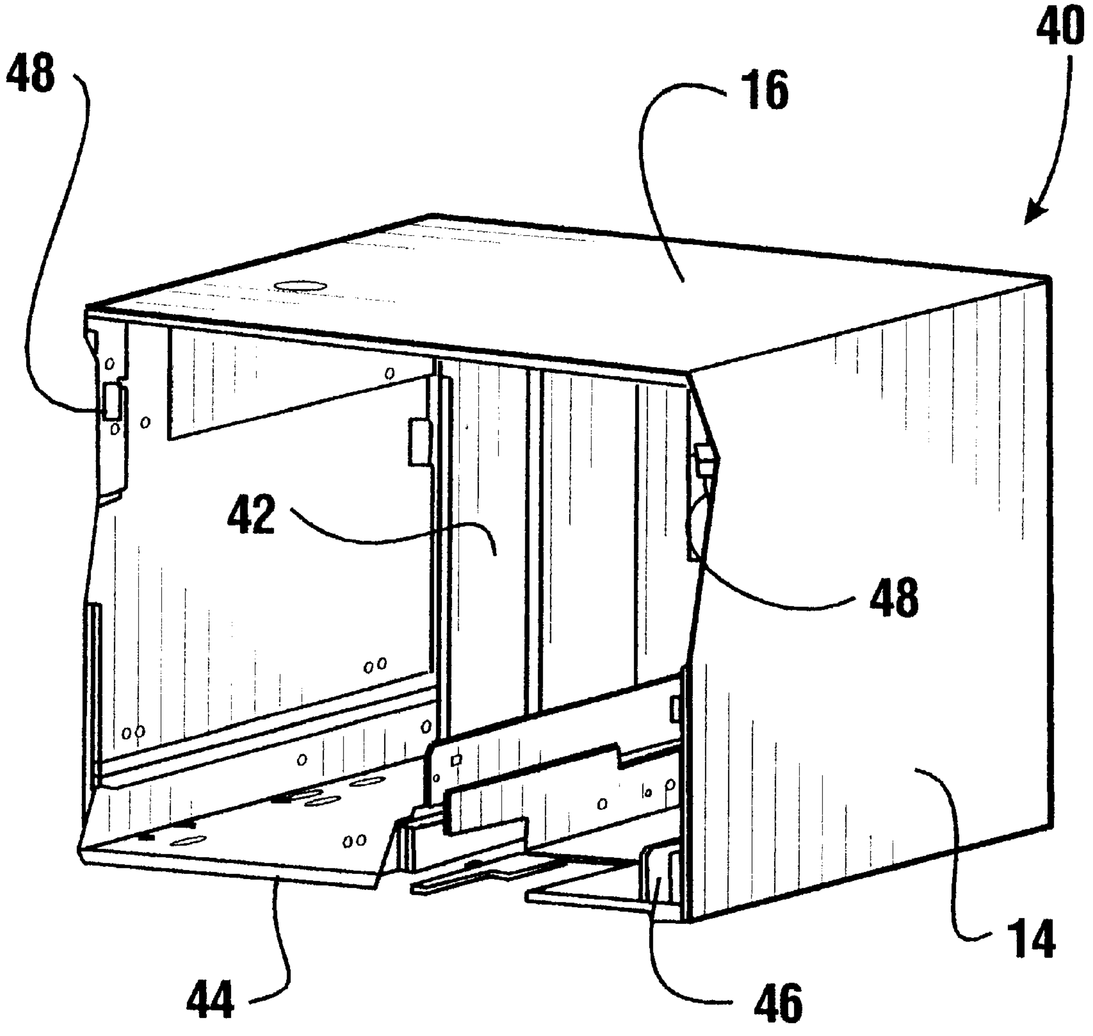
FIG. 5 is an isometric view of the enclosure for the automated teller machine.

As shown in FIG. 5, the upper portion of enclosure 12 is a top assembly 40 which is installed on the lower portion 36. Top portion 40 includes the upper sections of side walls 14 and top wall 16. Assembly 40 further includes a central dividing wall 42 and a bottom wall 44 which is supported on the lower portion 36.

Dividing wall 42 divides the interior of assembly 40 generally into equal width sides. Mounted on at least one side of assembly 40, and preferably on each side is a rollout tray 46 which is suitable for holding components of the automated teller machine which require periodic servicing. As later explained, depending on the type of automated teller machine the trays extend either through the front opening or the back opening of the machine.

Figure 4:
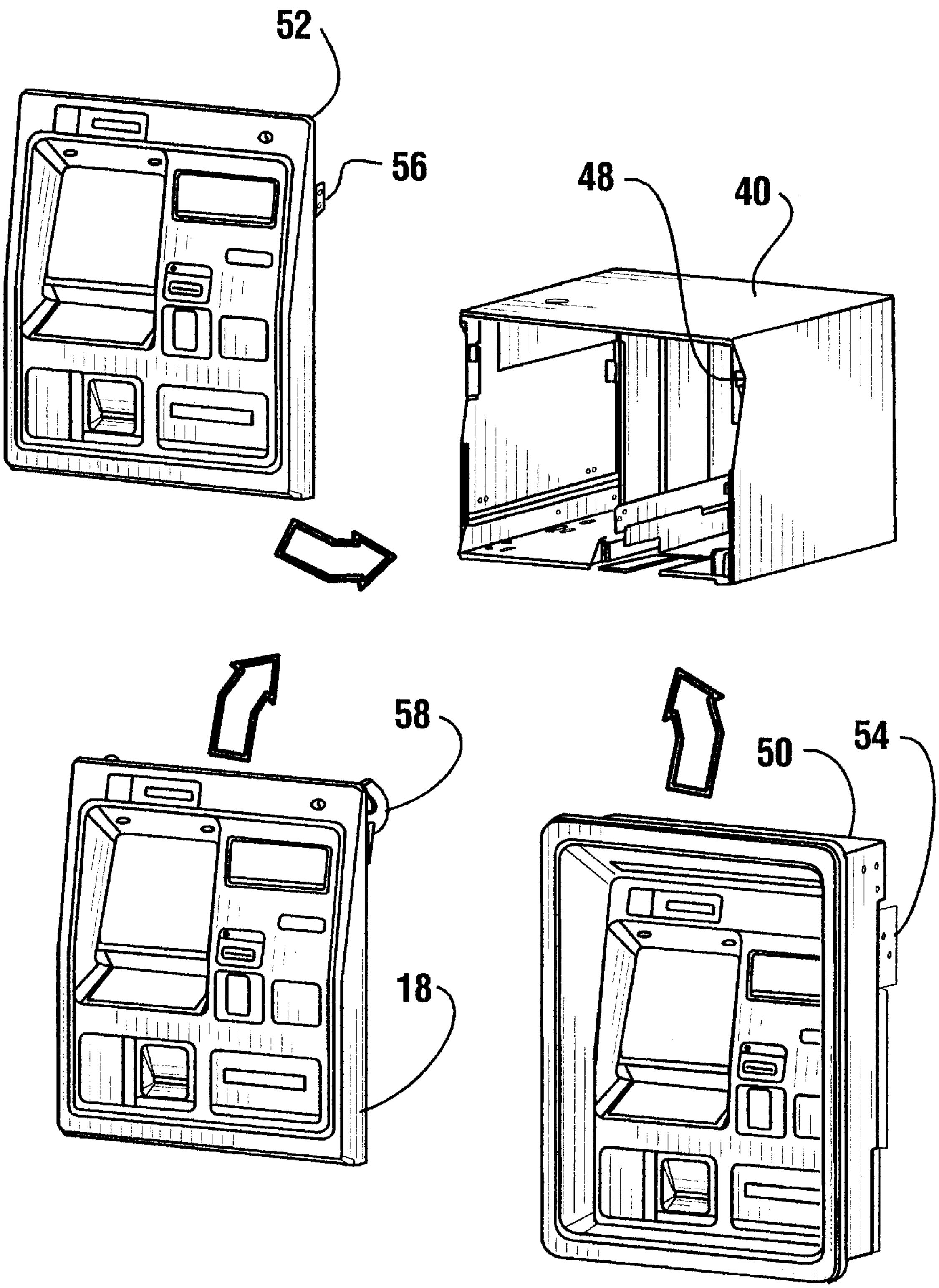
FIG. 4 is an isometric view of the universal enclosure or housing for an automated teller machine and the alternative types of fascias that may be installed thereon.

Top assembly 40 further includes a pair of mounting areas 48 which extend on each of the side walls 14. As shown in FIG. 4, top assembly 40 is suitable for having mounted thereon fascia 18, which is a fascia for a front load lobby type ATM assembly or, alternatively, a rear load through-the-wall assembly fascia 50 or, alternatively, a rear load lobby fascia 52. As shown in FIG. 4, the rear load through-the-wall fascia 50 and the rear load lobby fascia 52 include mounting brackets 54 and 56, respectively. Mounting brackets 54 and 56 include holes therethrough that are aligned with mounting holes in the mounting areas 48 of assembly 40. Conventional fasteners are installed to permanently affix either fascia 50 or fascia 52 to the mounting areas. These fasteners are installed from the inside of assembly 40 to avoid ready removal of these fascias. When fascia 50 or fascia 52 is installed on top assembly 40, the front opening of the assembly is generally permanently closed, and in such ATMs the back opening is provided with an access door for servicing.

Figure 2:
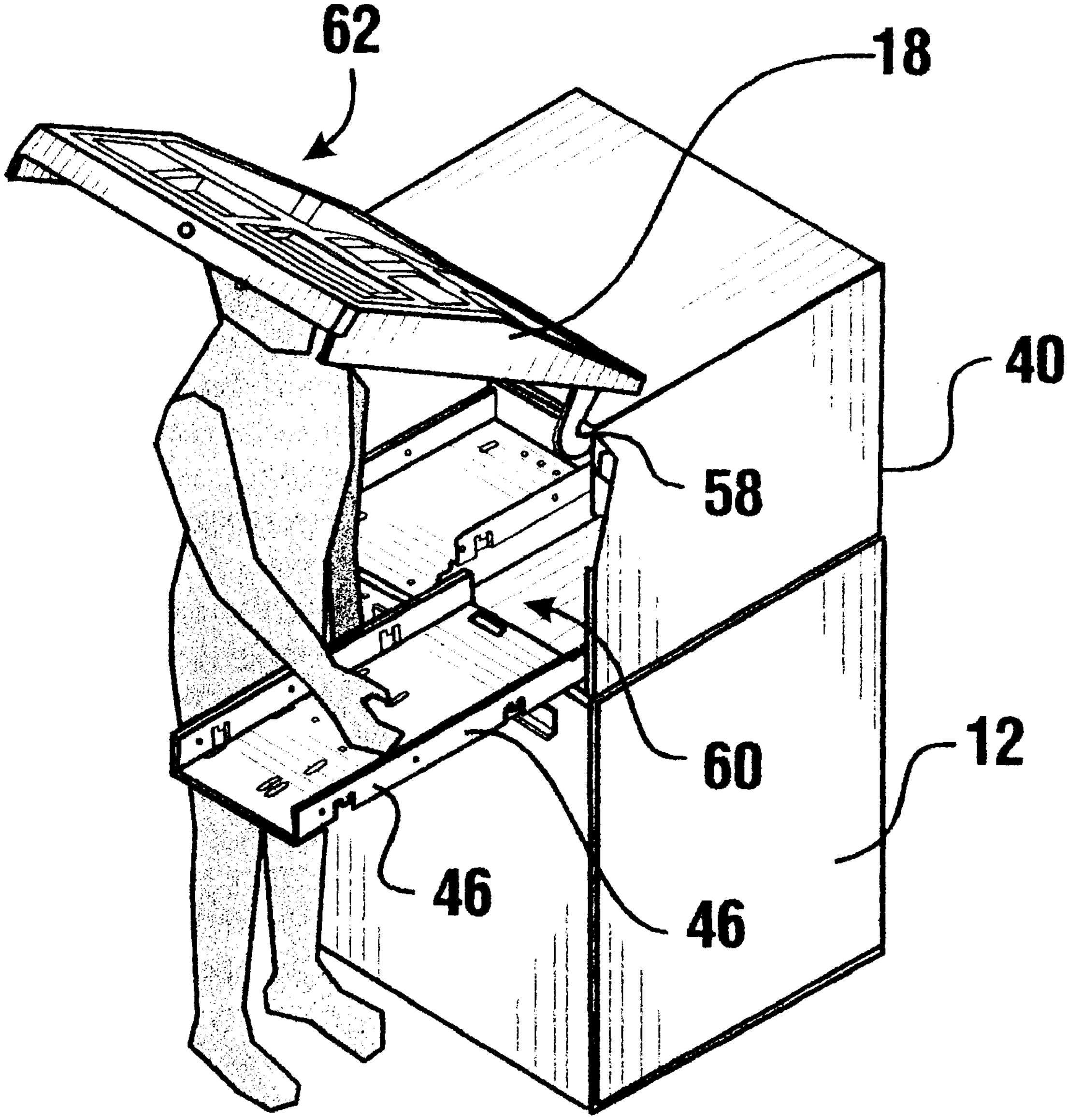
FIG. 2 is an isometric view of the automated teller machine shown in FIG. 1 with a service technician shown in position for working on the components thereof.
Figure 3:
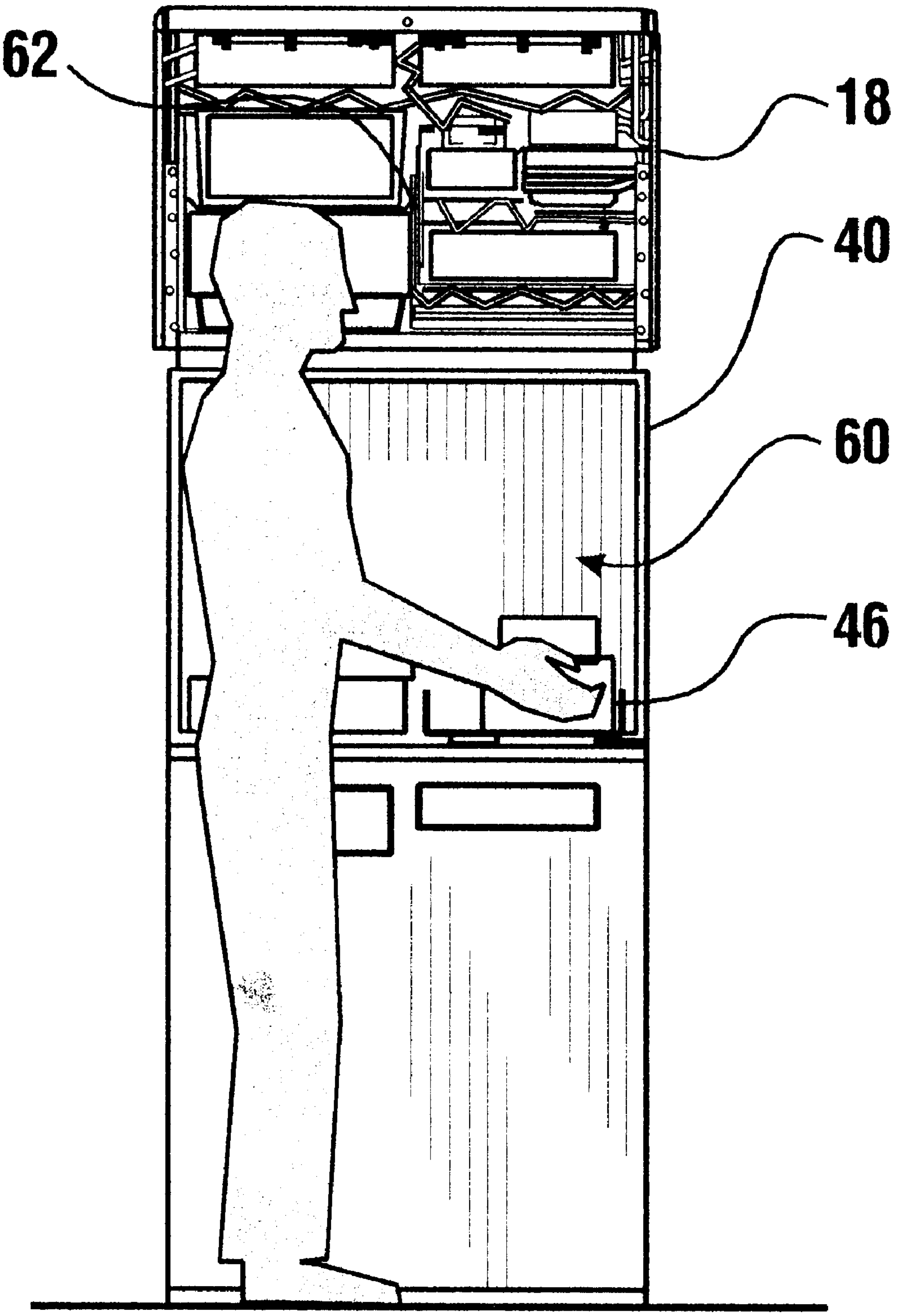
FIG. 3 is a front plan view of the automated teller machine and technician shown in FIG. 2.

Fascia 18, on the other hand, includes a pair of lifting arms 58 which are pivotally mounted on pins in the mounting areas 48. As a result, fascia 18 is enabled to be moved upwardly as shown in FIGS. 2 and 3. In the preferred form of the invention using front load fascia 18, the rear opening of assembly 40 is permanently closed by a closure panel (not separately shown) that is attached thereto. The closure panel is preferably held by fasteners and brackets that extend in the interior of the assembly to minimize the risk of unauthorized persons gaining access thereto.

Figure 10:
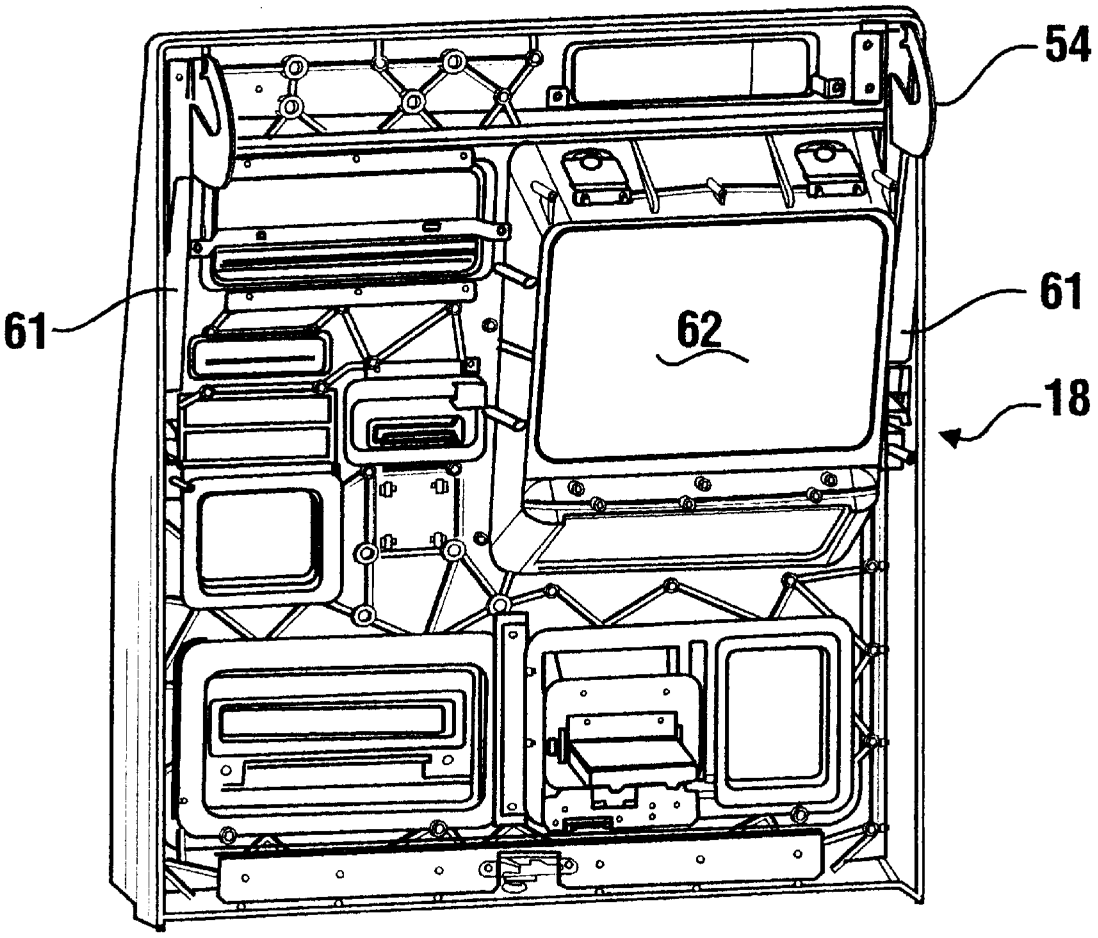
FIG. 10 is a rear isometric view of the fascia panel shown in FIG. 9.

As shown in FIGS. 2 and 3, the ATM enclosure 12 with the front load fascia panel 18 thereon is enabled to be accessed through a front opening 60 in top assembly 40. Fascia 18 may be lifted for servicing of the ATM and held by gas springs 61 (see FIG. 10) in the upright position. This enables ready servicing of the machine by a technician as demonstrated in FIGS. 2 and 3.

The trays 46 are mounted in the assembly 40 in drawer-like fashion such that the trays and the electronic components located thereon may be moved forward through the front opening 60. The technician is enabled to stand to the side of the extended tray 46 to service the components located thereon. Further, the screen opening 62 which provides visual access to the screen 22 in the down position of the fascia 18 provides an opening through which a technician may extend his head during servicing of the components that are located on extended tray 46.

When the technician has completed servicing the equipment on tray 46, they may return the tray and components into the interior of assembly 40. Thereafter the technician may step to the opposite side of the machine in front of the tray that has been returned and work on components on the opposite side of the assembly and/or pull out components located on a similar tray therein. The trays include a latching mechanism (not shown) to hold them in position when retracted into assembly 40.

A technician servicing the machine shown in FIGS. 1 through 3 need never leave the area directly in front of the machine and under the raised fascia 18. The "footprint" for servicing of the machine is much smaller than it would be if the machine were constructed with a full width tray and the technician had to stand further ahead of the tray when it was extended. The ATM of the present invention can be installed in tighter spaces than would otherwise be possible. Of course, when the technician has completed servicing the machine, the fascia 18 may be pivoted downward to again cover the front opening to the enclosure in locked position using an appropriate locking mechanism.

Figure 20:
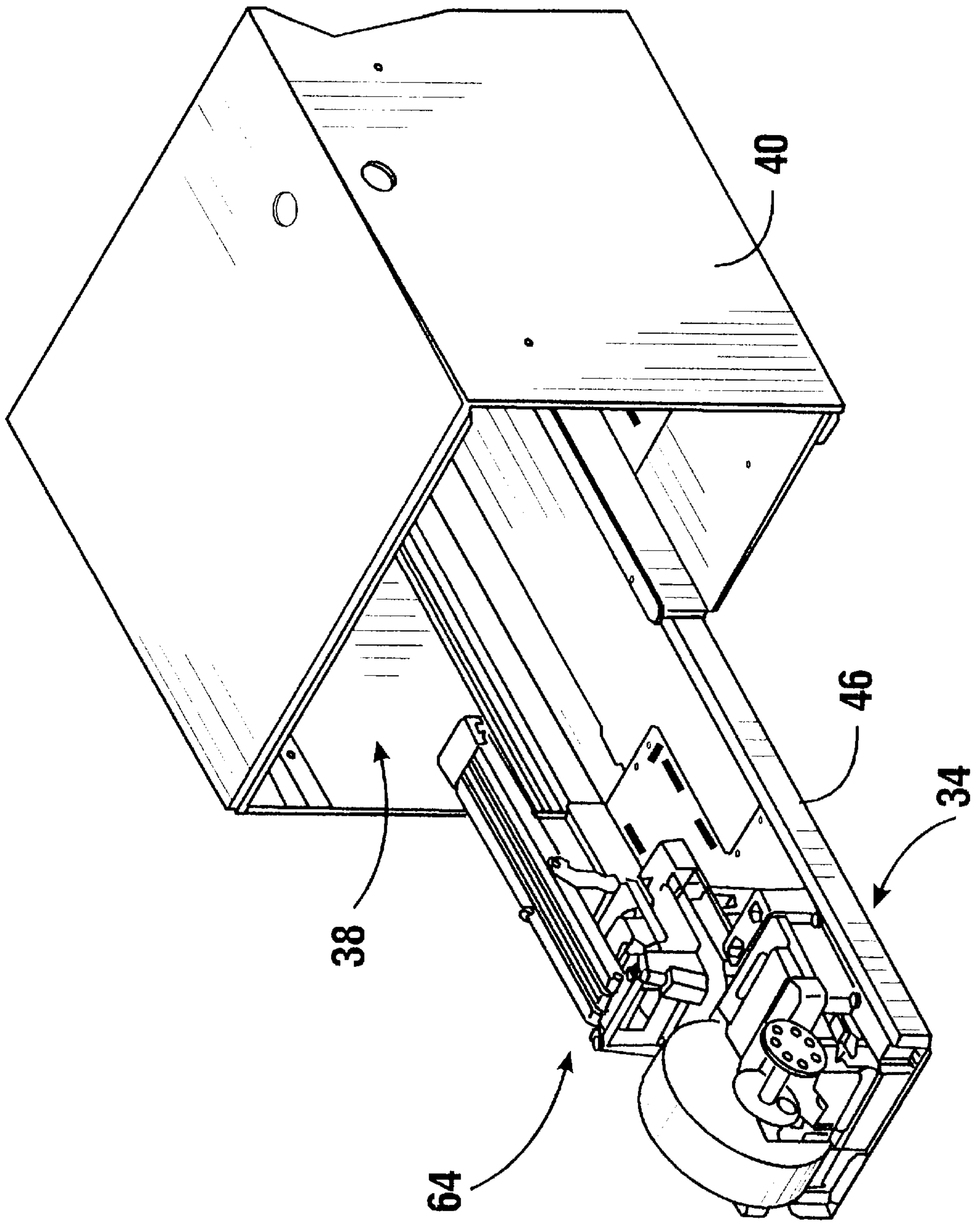
FIG. 20 is a rear isometric view of the receipt printer and delivery mechanism shown in a position extended from the enclosure of the machine for servicing.

In cases where the fascias 50 or 52 are permanently installed at the front of assembly 40 so as to close the front opening, the rollout trays 46 are installed in the top assembly 40 to be movable out the back opening 38 as shown in FIG. 20. For ATMs of this type, the back opening 38 is provided with a swing open door (not shown) which can be locked in closed position by a suitable locking mechanism. For these configurations the technician is enabled to stand behind the machine on one side and extend the tray 46 on the opposite side to service the components thereon. Thereafter, the technician may reverse sides and work on the components on a tray or otherwise positioned in the opposed side of the enclosure. The technician is enabled to service the components of the machine without having to work behind the trays. As a result, the rear of the machine may be installed in closer proximity to a wall which saves space.

Figure 11:
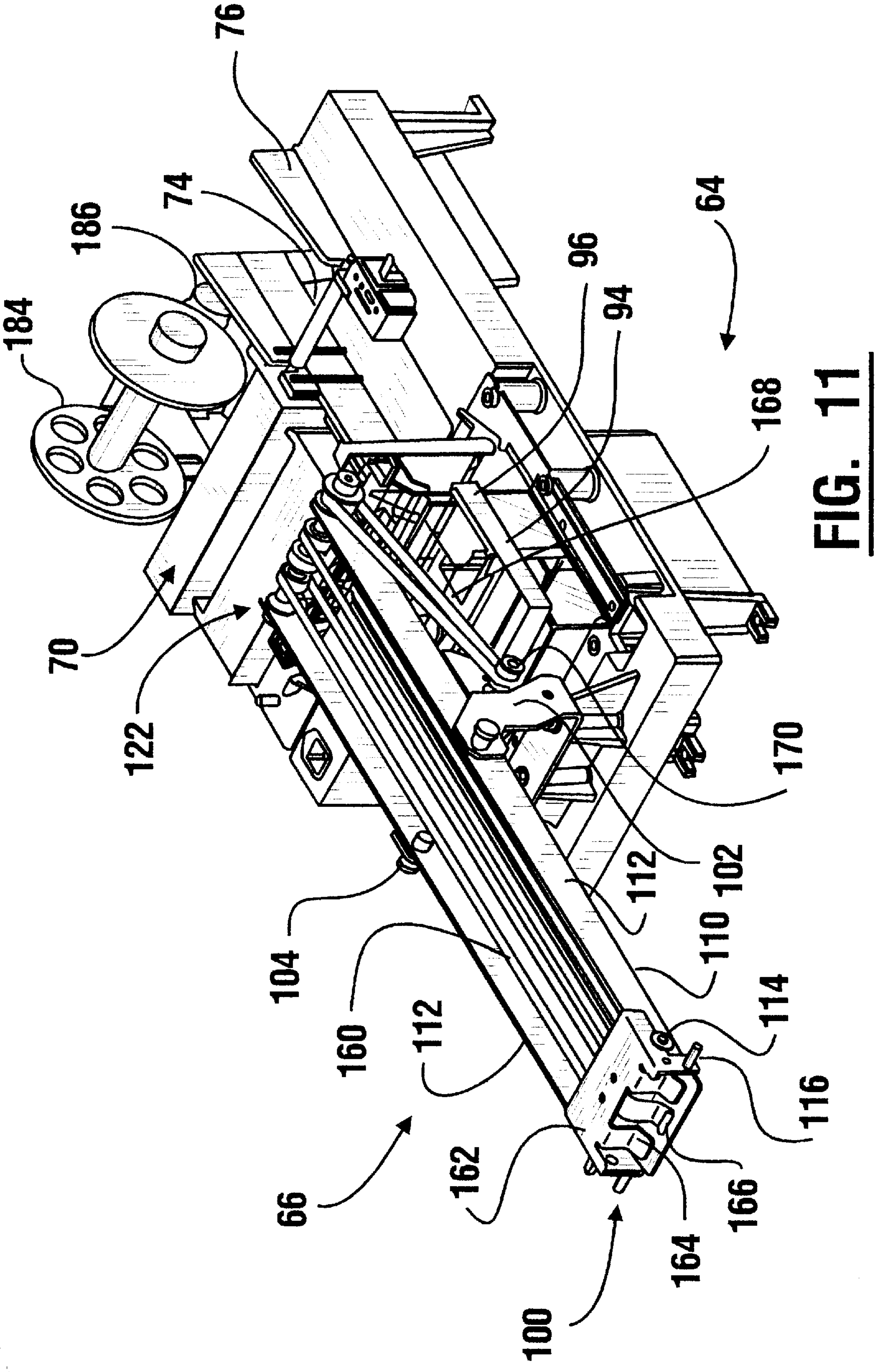
FIG. 11 is a side isometric view of a receipt printer assembly and receipt delivery mechanism.

In the preferred embodiment of the present invention, a component that is mounted on rollout tray 46, regardless of the type of fascia used, is a receipt and journal printer and receipt delivery assembly 34 shown in FIG. 11. Assembly 34 includes a receipt transport generally indicated 66. Assembly 34 further includes a receipt printer mechanism generally indicated 68 (see FIGS. 12 and 13) and a journal printer mechanism generally indicated 70.

Figure 13:
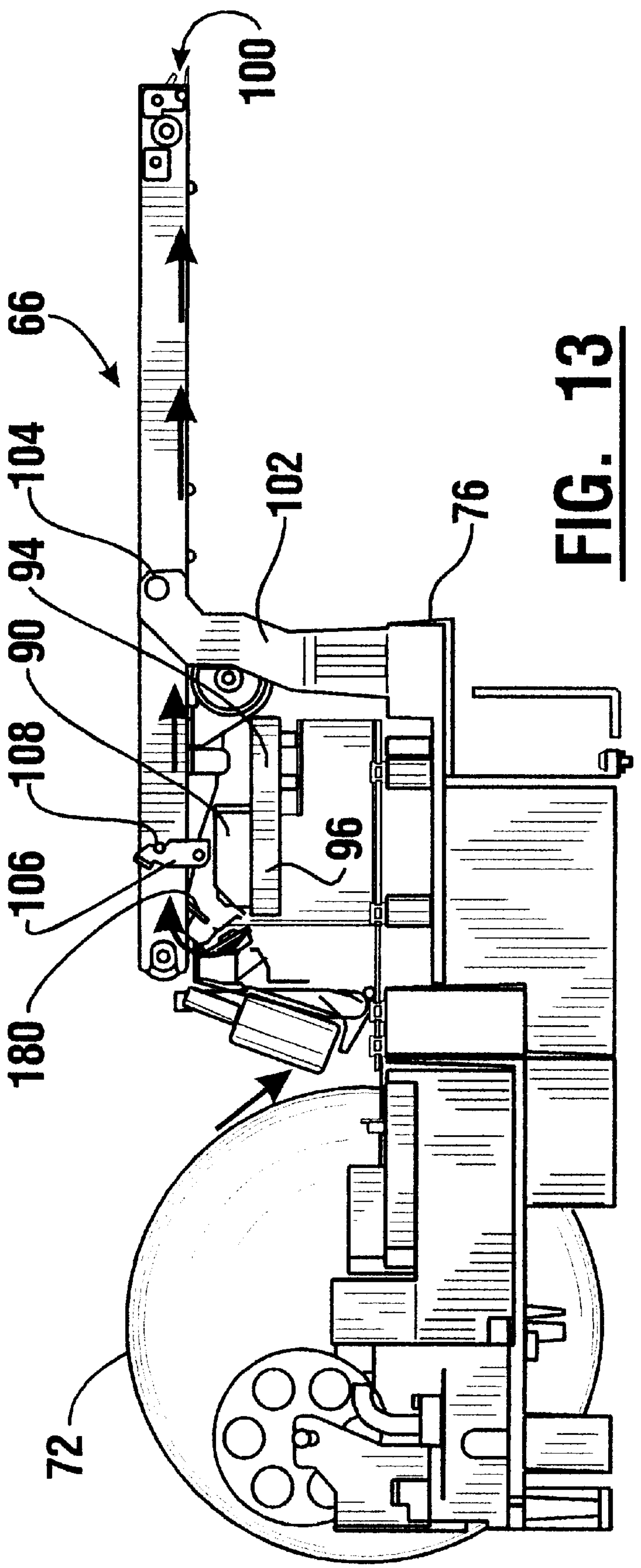
FIG. 13 is a right side view of the receipt printer and delivery mechanism shown in FIG. 11.
Figure 17:
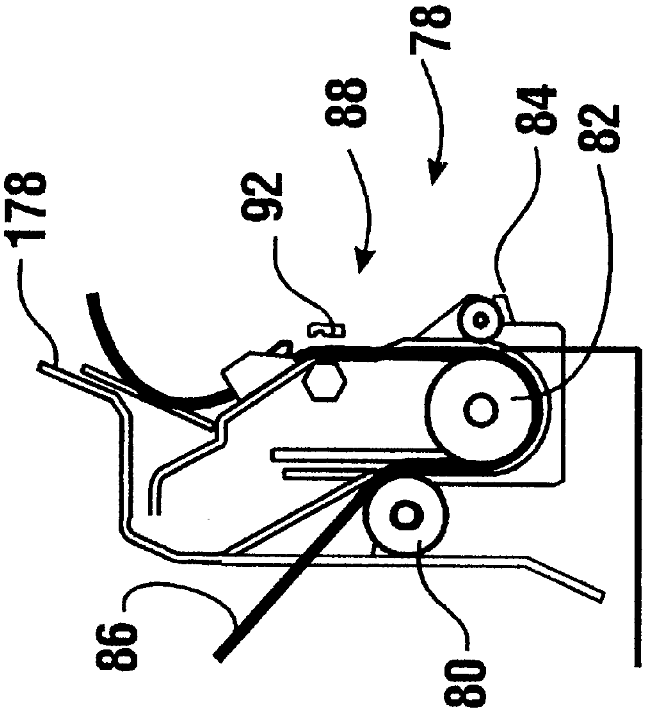
FIG. 17 is a cross sectional view showing the paper path through the receipt printing mechanism.

The function of the receipt printer mechanism 68 is to print customer receipts on paper that is drawn from a roll 72. Roll 72 is journaled on a shaft 74 supported on a base 76 of the receipt printer. As shown in FIGS. 13 and 17, paper from the roll 72 is drawn through a printer feed and cutter housing 78 wherein guiding and driving rolls 80, 82 and 84 pull the paper 86 therethrough. The paper is guided to a printing position, generally indicated 88 in the printer housing. In the printing position, the pins of an impact print head 90 strike the paper 86 through a ribbon 92 to enable printing of characters on the paper.

The ribbon extends from the side of a ribbon cartridge 94 which has ribbon guide arms 96 which straddle the print head (see FIG. 11).

Printer housing 78 includes a knife (not separately shown) which is actuated by a solenoid 98 which cuts off the paper 86 after the receipt has been printed. Thereafter the receipt is delivered by the transport 66 in a manner later explained to an opening 100 at the end of the transport where it may be taken by a customer through receipt opening 26 of the fascia.

Figure 18:
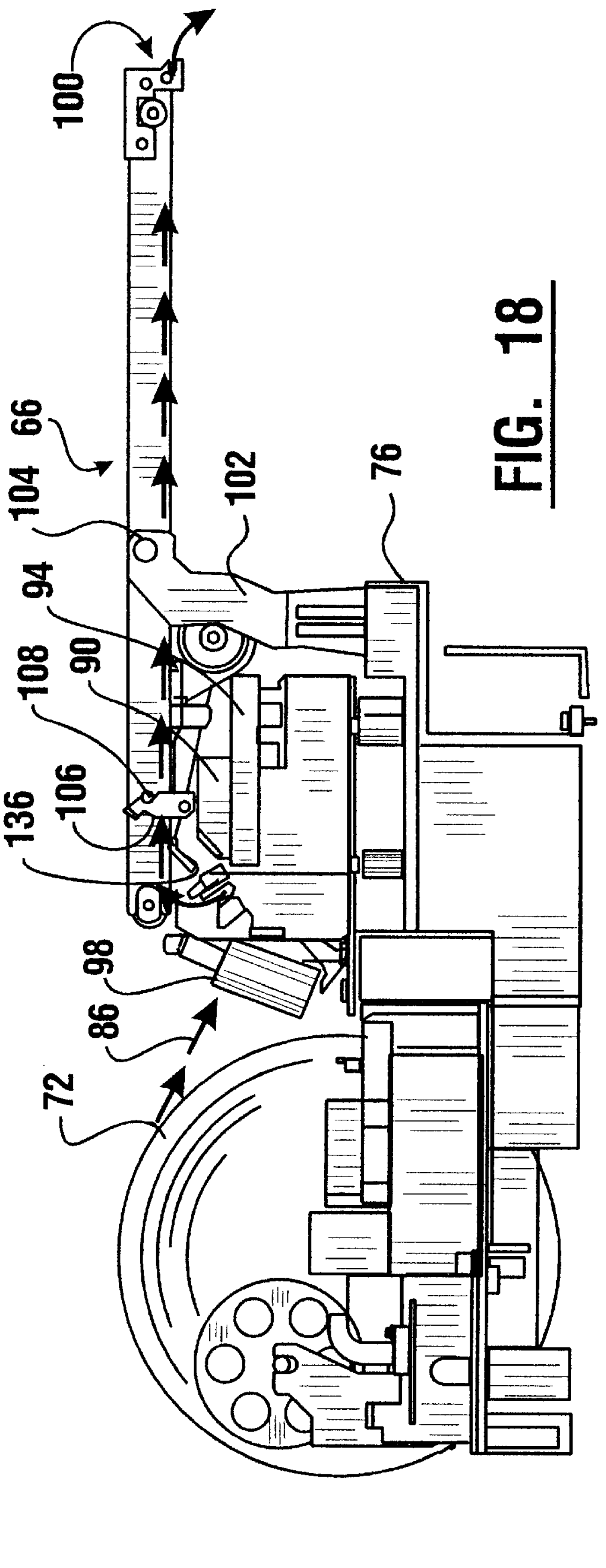
FIG. 18 is a right side view showing the paper path through the receipt printer and delivery transport mechanism in the receipt delivering position.

As best shown in FIGS. 13 and 18, in the operable position of the receipt transport 66, the transport extends over the print head 90 as well as the cartridge 94. Because the cartridge 94 requires periodic replacement, the transport 66 is mounted to pivot on a pair of arms 102 which extend upward from a U-shaped bracket mounted on the base 76. The arms each have a pin 104 which is engaged to the transport. As later explained, each pin extends through a slightly slotted opening in the side walls of the transport frame which enables the transport to have a slightly floating mounting.

Figure 19:
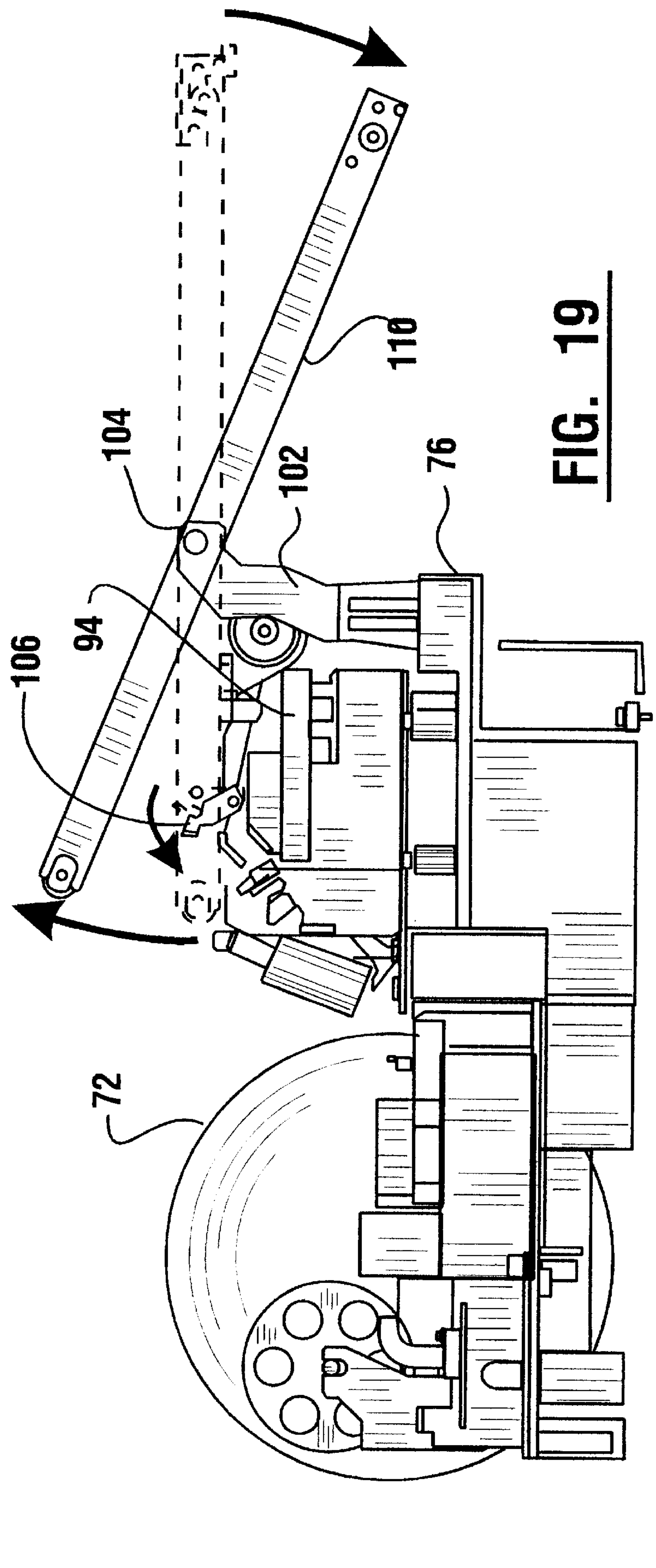
FIG. 19 is a right side view of the receipt printing mechanism and delivery transport shown in the position for servicing of the printer and ribbon.

As shown in FIGS. 18 and 13, a lever 106 is pivotally mounted to a fixed member that extends above the print head. Lever 106 is spring loaded and includes a notch that is engagable with a pin 108 that is located on the receipt transport 66. When it is desired to change the cartridge 94, or service the print head, receipt transport 66 may be pivoted forward by disengaging lever 106 from pin 108. This enables the front of the transport mechanism to be moved downward as shown in FIG. 19 to provide access to those components. After the servicing is completed, the transport is rotated back to the position shown in FIGS. 13 and 18 wherein it is automatically latched into position by a spring loaded lever 106.

As previously discussed, transport 66 includes a U-shaped frame 110 which includes a pair of spaced upward extending side walls 112 and a traversely extending bottom wall 114. The openings in side walls 112 which accept pins 104 are slightly vertically elongated. This enables the opening 100 at the outer end of the receipt transport 66 to float slightly up and down.

Figure 15:
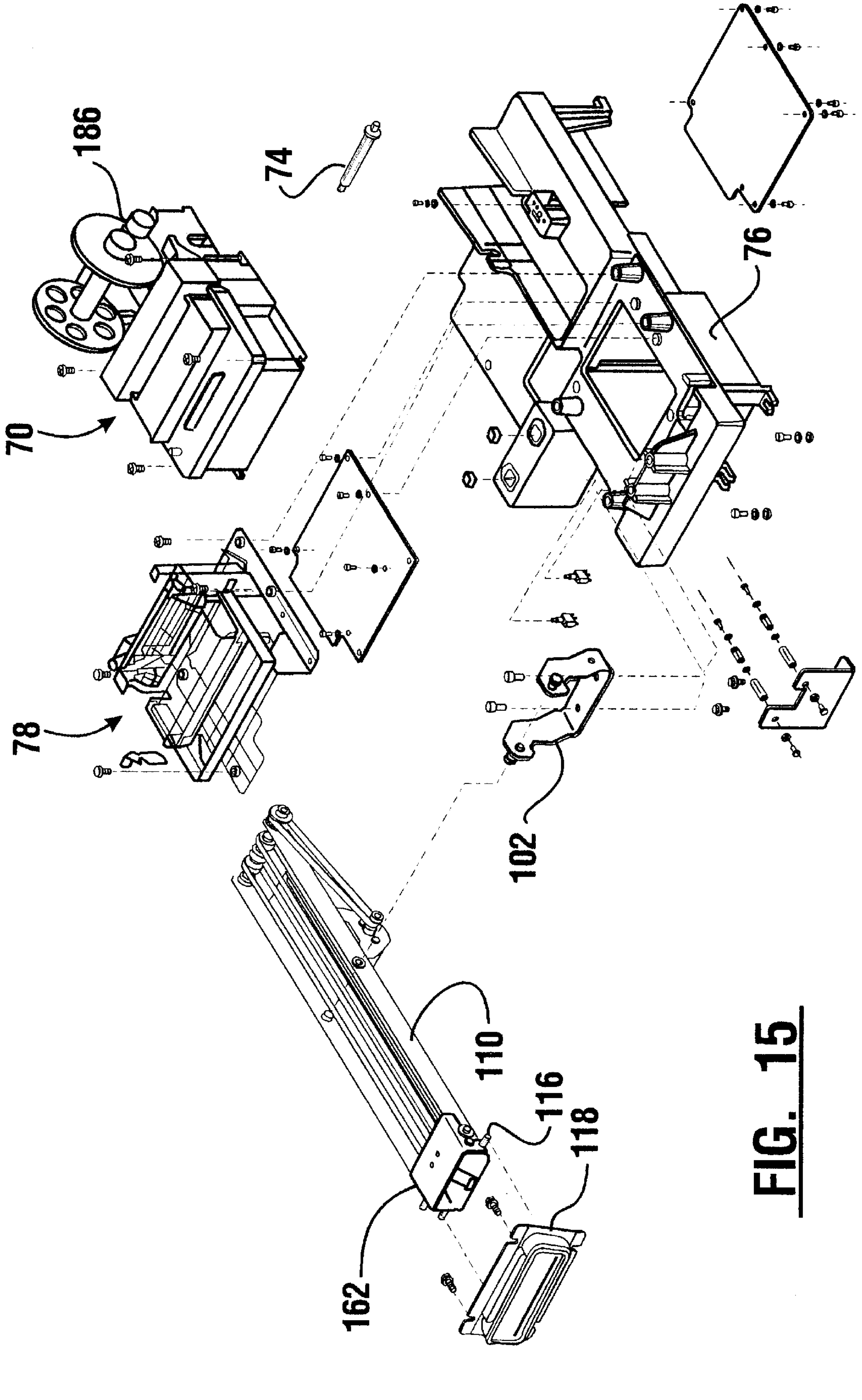
FIG. 15 is an exploded view of the components of the receipt printer and delivery mechanism.

A pair of pins 116 extend on opposed sides of opening 100. Pins 116 are sized for acceptance in V-shaped slots that extend inwardly from the backs of the fascias 18, 50 and 52. As a result, when the fascia is moved adjacent to opening 100 or, alternatively the transport is moved into proximity with a fixed fascia, the opening 100 is aligned with the appropriate opening in the fascia to deliver the receipts therethrough. The floating character of the transport 66 enables the transport to accommodate slight misalignments with the fascia while still delivering the receipts properly therethrough. As shown in FIG. 15, the fascia includes an insert 118 which includes the rearward extending slots which align the opening 100 at the end of the receipt transport 66.

Figure 14:
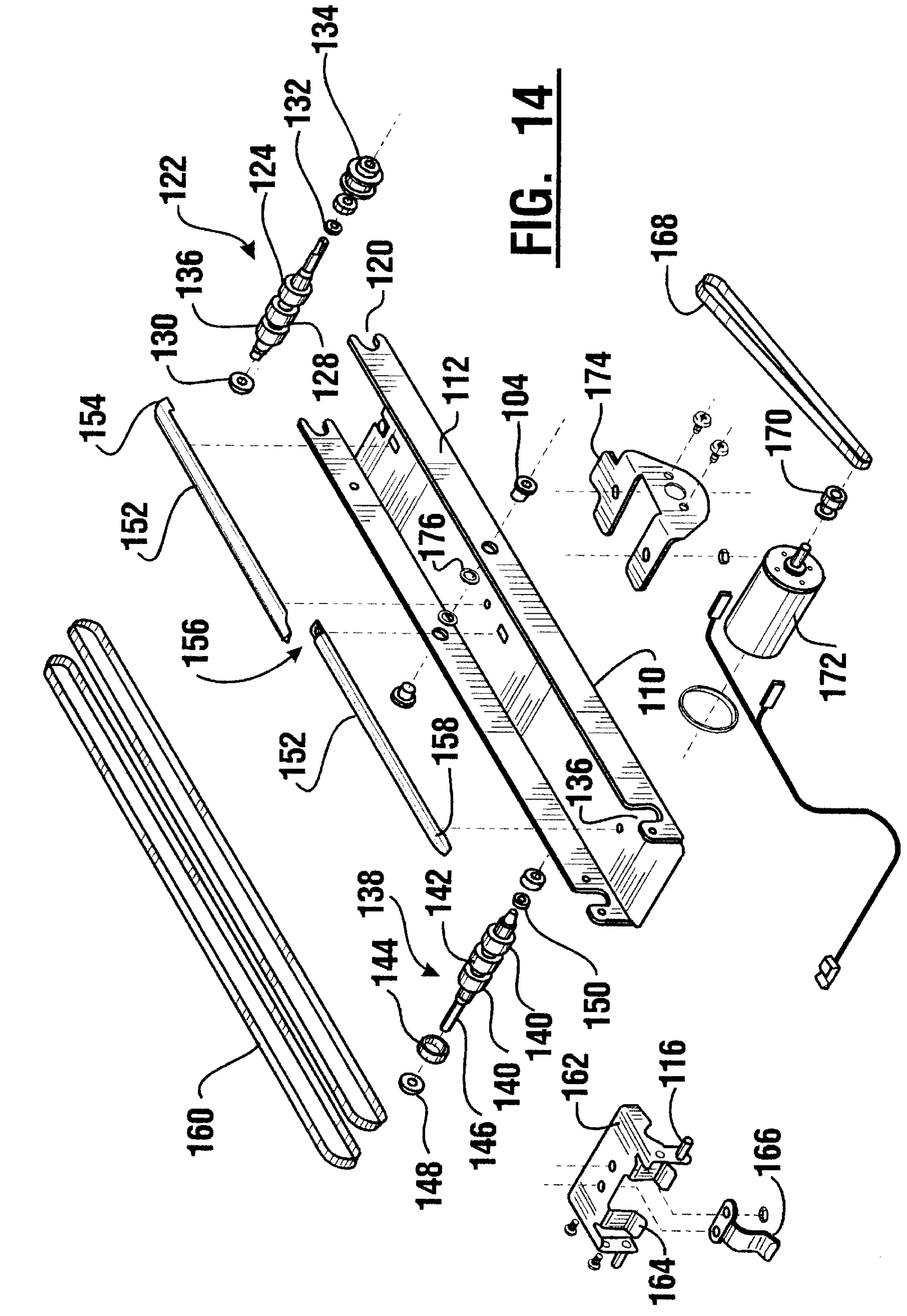
FIG. 14 is an exploded view of the receipt delivery transport mechanism.

The frame member 110 has longitudinally extending notches 120 in the side walls 112 thereof. As best shown in FIG. 14, notches 120 accept a back axle assembly 122 therein. The back axle assembly includes an axle shaft 124 which has a pair of belt driving rolls 126 and a center guide roll 128 thereon. Axle shaft 124 is stepped to axially position flanged bushings 130 which nest in notches 120. A wave spring 132 is mounted on the shaft between a step and a bushing to take up any end play. A drive pulley 134 is mounted on shaft 124.

Frame 110 further includes vertically extending notches 136 in the side walls 112. Notches 136 accept a front axle assembly 138. Front axle assembly 138 includes a pair of belt driving rolls 140 and a guide roll 142 thereon. Guide roll 142 further includes a resilient overlying feed roll cover 144 thereon.

Rolls 140 and 142 are mounted on an axle shaft 146 which is a stepped shaft similar to shaft 124. A pair of bushings 148 enable shaft 146 to nest in notches 136. A wave spring 150 mounted on shaft 146 between a bushing and a step on the shaft takes up of any play therein.

Figure 16:
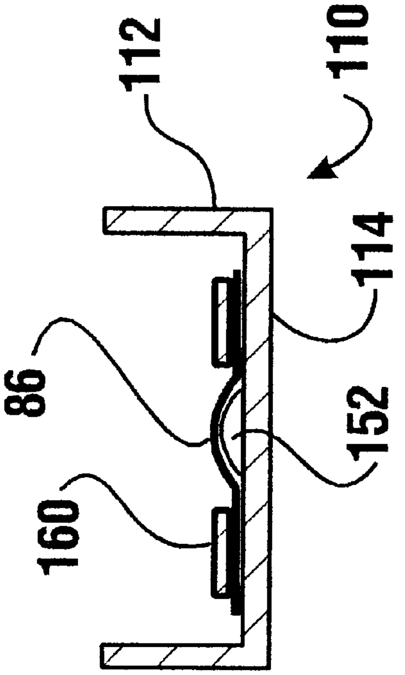
FIG. 16 is a cross sectional view of the receipt delivery transport.

A two piece centrally extending rib 152 extends upward from the bottom wall 114 of frame 110 (see FIG. 16). Rib 152 has a tapered lead-in section 154 which extends through a notch in the bottom wall 114 to facilitate engagement of paper on to the rib as later explained. The rib further includes a tongue-and-groove connection 156 where the rib sections are joined to enable the rib 152 to have a substantially smooth and continuous upper surface. The rib further includes an outlet section 158 that is tapered to provide a smooth area for disengagement of the paper and the rib. The rib is fastened to the bottom wall 114 through projections which extend through alignment slots and fasteners.

A pair of resilient belts 160 extend between the belt driving rolls 126 and 140 in the front and back axle assemblies. As shown in FIG. 16, the lower belt flights are positioned on opposed sides of rib 152. The lower belt flights are supported on the lower wall 114 and are movable to accept paper moving thereinbetween.

FIG. 14 also shows a bracket 162 that is mounted on frame 110 at opening 100 of the transport. Bracket 162 includes the alignment pins 116. Bracket 162 includes a pair of downward extending finger projections 164 which direct paper downward as it reaches the transport opening. A spring 166 extends downward from the center of bracket 162.

Spring 166 is in contact with lower wall 114 of the transport frame and serves to hold receipt papers in position thereunder.

The drive pulley 134 on axle shaft 124 is driven by a belt 168. Belt 168 is driven by a pulley 170 that is mounted on the drive shaft of a motor 172. Motor 172 is mounted in a bracket 174 which extends from the underside of frame 110.

As shown in FIG. 14, the pins 104 which extend through the elongated holes in the side walls 112 of the transport frame 110 are held in position by locking rings 176.

As shown in FIG. 18, paper 86 is unrolled from roll 72 and travels along the path of the arrows as shown. The paper passes through the printer housing 78 where characters are printed by the print head through the ribbon 92. As the printing occurs, the rolls 82 and 84 guide and advance the paper.

As the paper rises up out of the print housing, it is urged to the forward position by a forward extending tab 178. The paper is further guided upward by a tab 180 which extends downward and angularly rearward from the bottom wall 114 of the transport frame 110. The paper upon reaching the top of tab 180 is contacted by the lower flights of belt 160 and the lead-in section of rib 152. As soon as motor 172 is started, the paper is pulled between the belts 160 and the rib 152 as shown in FIG. 16.

In operation, the receipt is printed in housing 78 and cut off by the knife assembly therein. Immediately thereafter motor 172 is started which causes the receipt to be engaged between rib 152 and the drive belts 160 as shown in FIG. 16, in which position it is rapidly pulled forward in the transport and under the guide roll 142 of axle shaft 146. The receipt is urged downwardly by the fingers 164 and bracket 162 and is held in place extended through the opening 26 in the fascia by spring 166. The customer then takes the receipt and the transport is ready to deliver additional receipts. If the customer does not take their receipt, additional receipts will push the existing receipt out of the opening and the new receipt held in position extending out of the opening in the ATM.

The receipt transport of the present invention is particularly novel as it provides for the rapid and jam-free delivery of receipts to a customer. It also achieves a reduction in space by allowing the print head 90 and print ribbon cartridge 94 to be installed under the transport while still enabling access thereto for servicing and changing the print ribbon.

Figure 12:
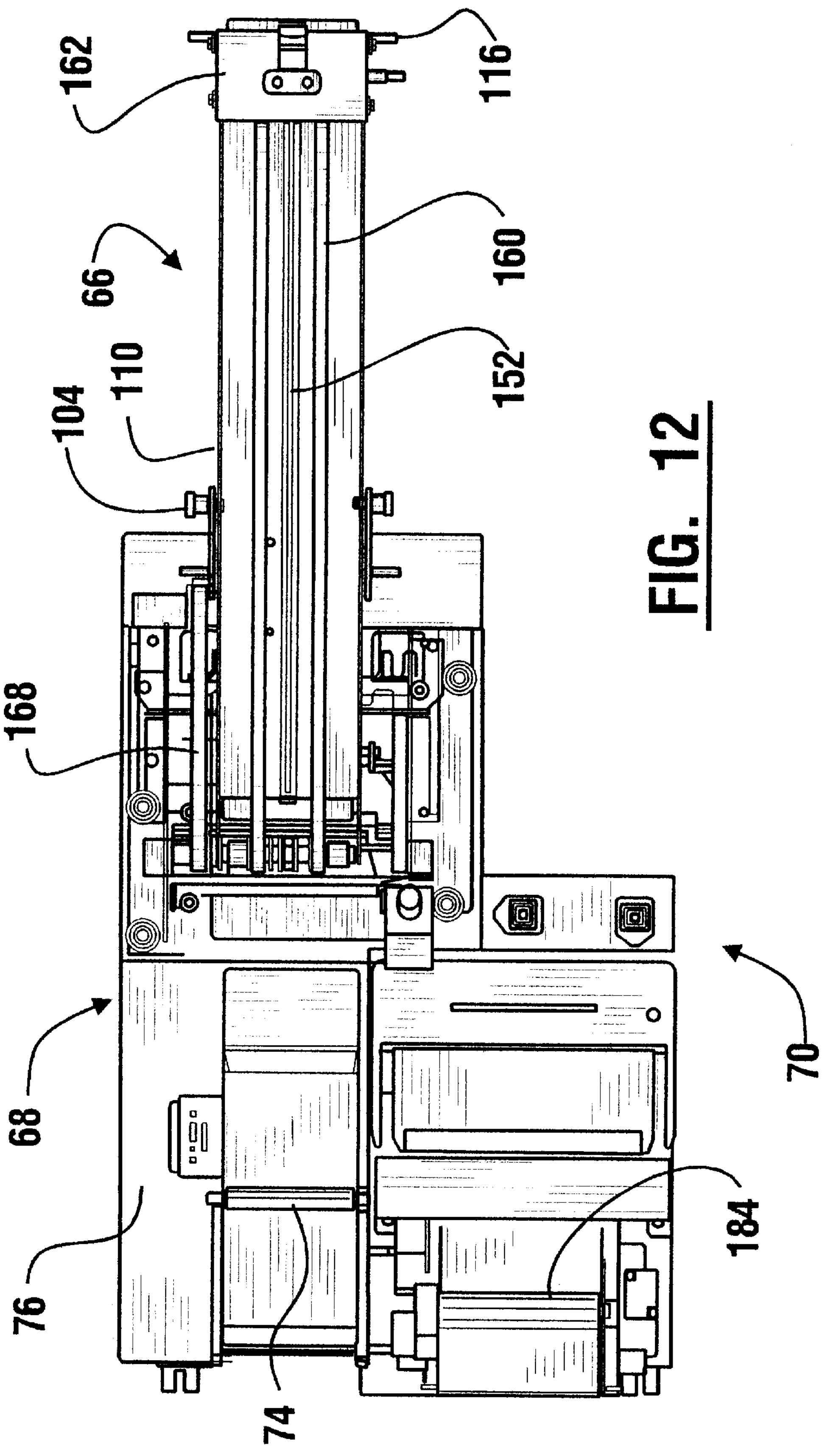
FIG. 12 is a top view of the mechanism shown in FIG. 11.

As shown in FIGS. 12 and 11, base 76 also has mounted thereon the journal printer generally indicated 70. The journal printer serves to record on a continuous tape the information that was provided to customers on customer receipts. It allows the institution operating the ATM to maintain a hard copy record of all the transaction information. The journal printer 182 operates to unroll paper mounted on a spool 184, to pass the paper through a printer mechanism and then rewind the paper on to another spool 186.

The side-by-side installation of the journal printer 182 on a common base 76 with the customer receipt printer provides for a compact unit and efficient installation on a rollout tray of the ATM as shown in FIG. 20. This installation further facilitates servicing and changing of the paper rolls on both the customer receipt and journal printers.

The preferred embodiment of the present invention also includes a unique mounting mechanism for the monitor of the ATM. Because the present invention involves an ATM enclosure or housing that may be adapted to have various types of fascias, there must be provided a mechanism for aligning the customer interface screen 22 with the screen opening 62 in the various fascias.

Figure 21:
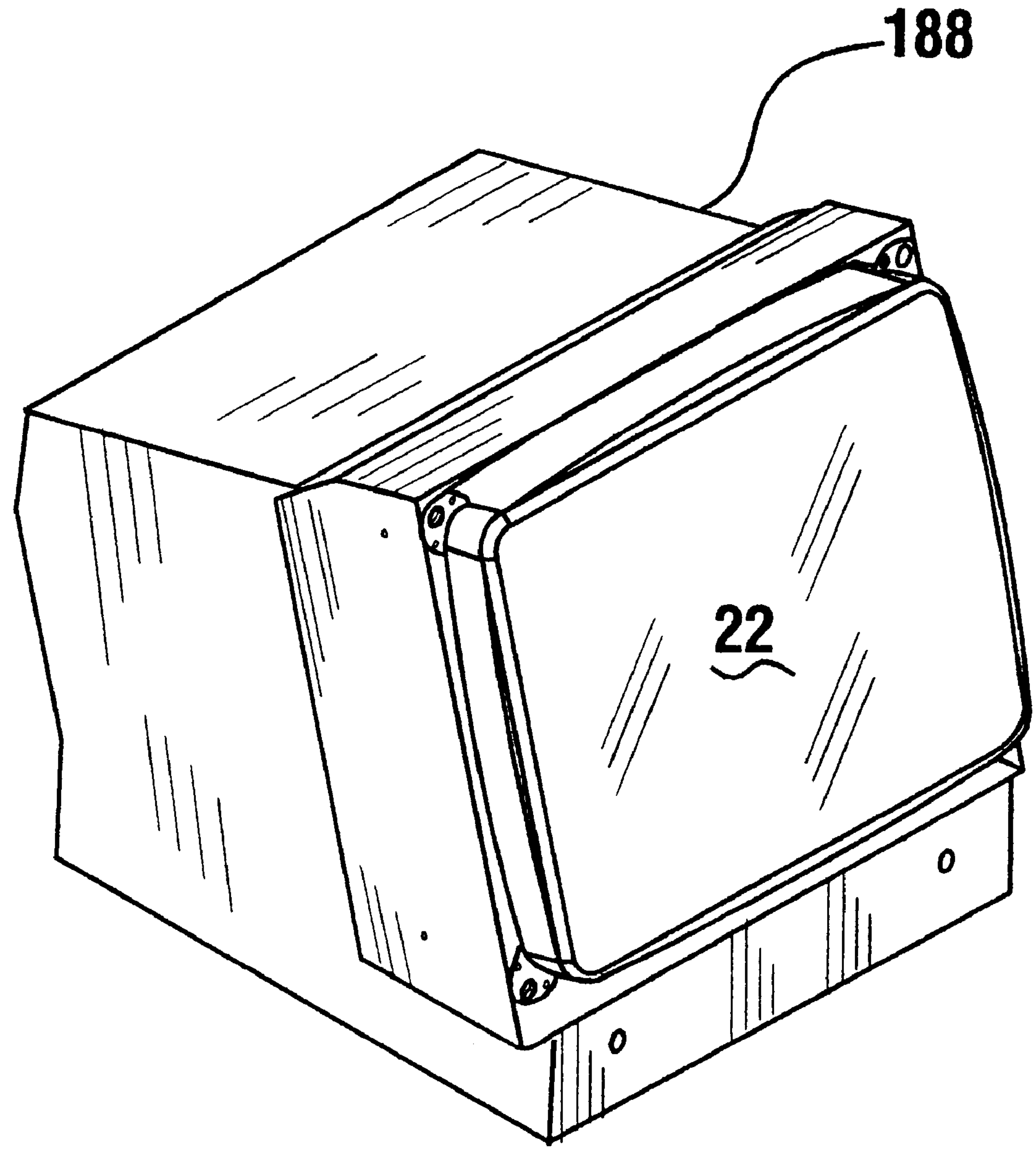
FIG. 21 is an isometric view of the monitor and screen of a customer interface of an automated teller machine.
Figure 22:
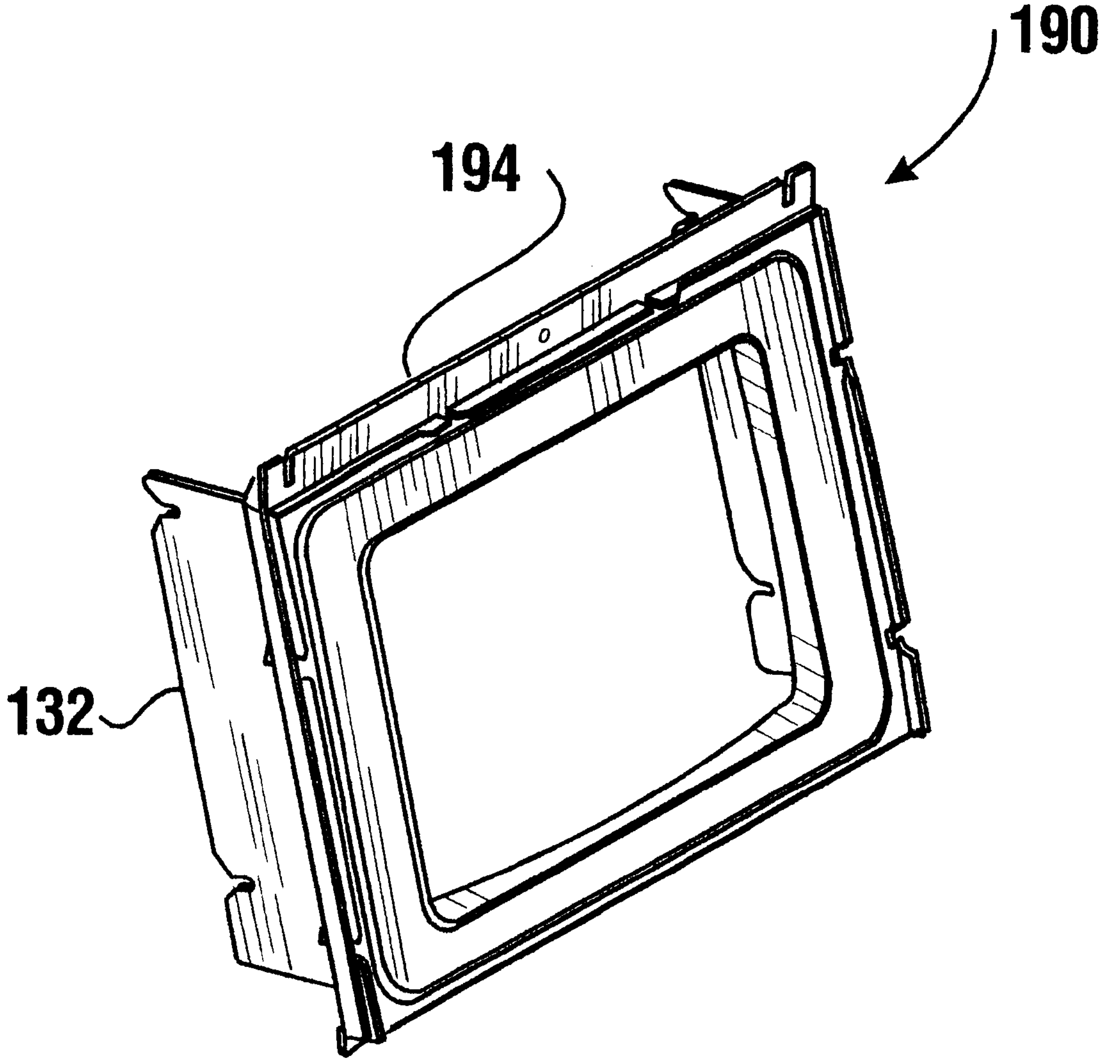
FIG. 22 is an isometric view of the screen surround assembly for the monitor shown in FIG. 21.
Figure 23:
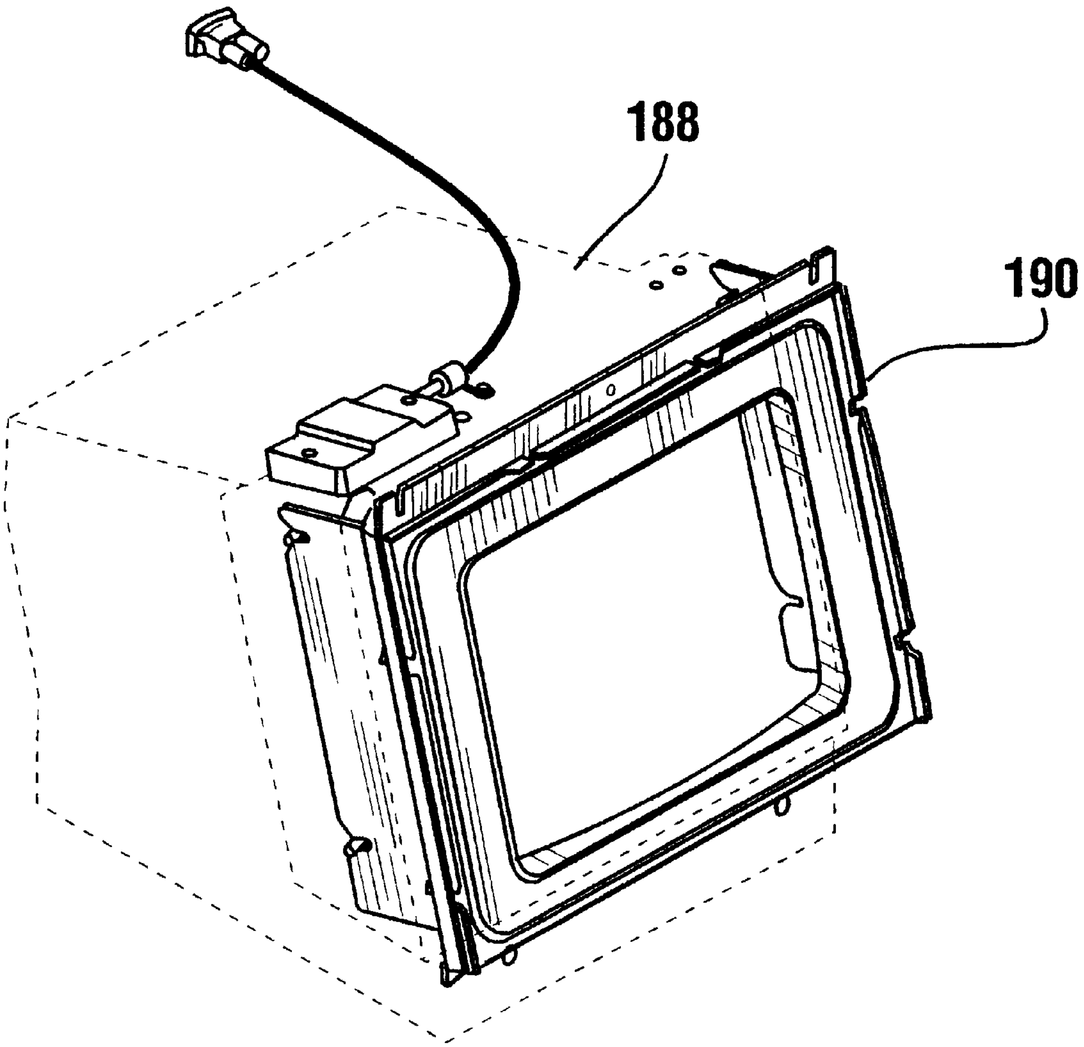
FIG. 23 is a partial phantom isometric view showing the screen surround installed on the monitor.
Figure 24:
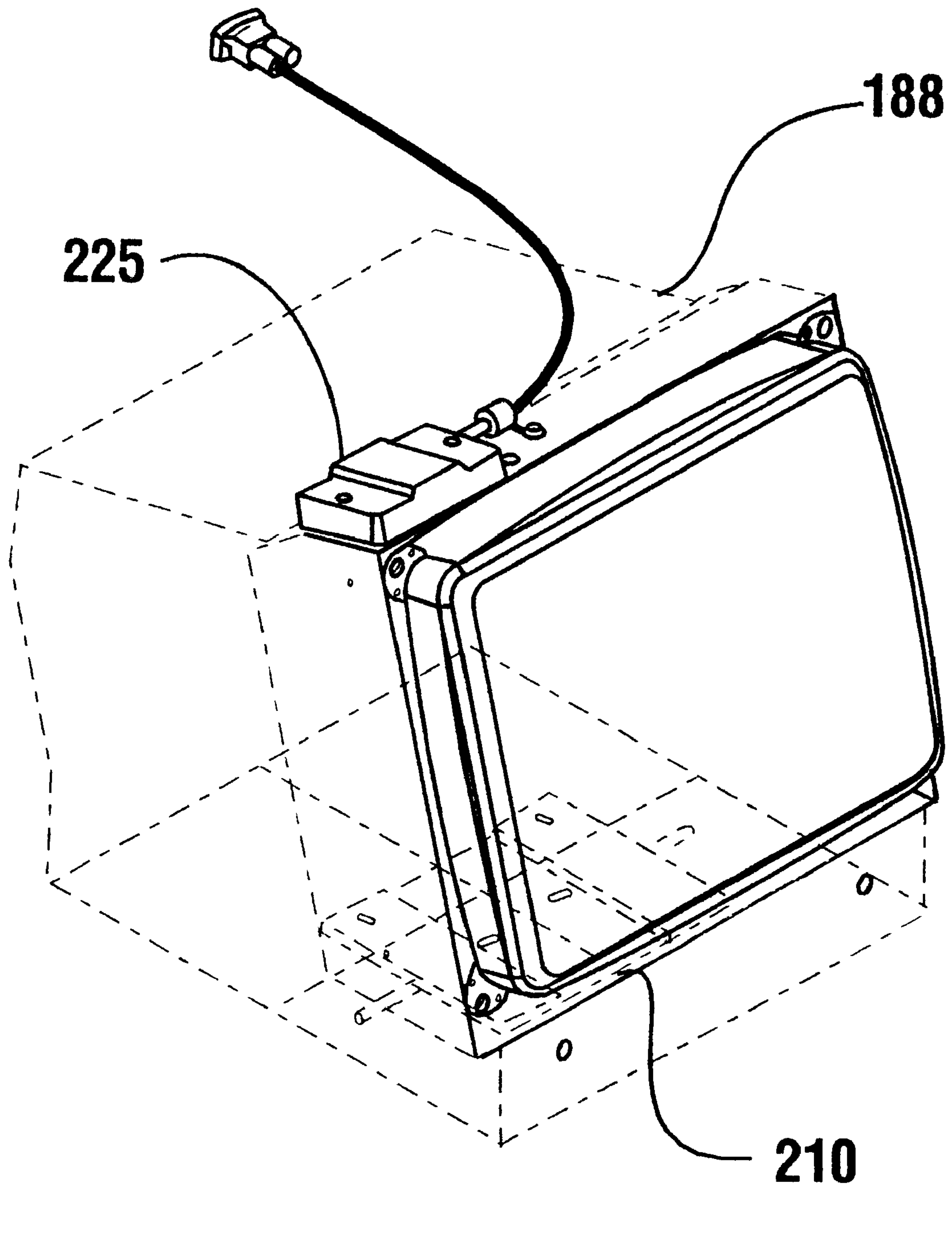
FIG. 24 is a partial phantom view of the monitor shown in position on a bottom mounting plate.
Figure 25:
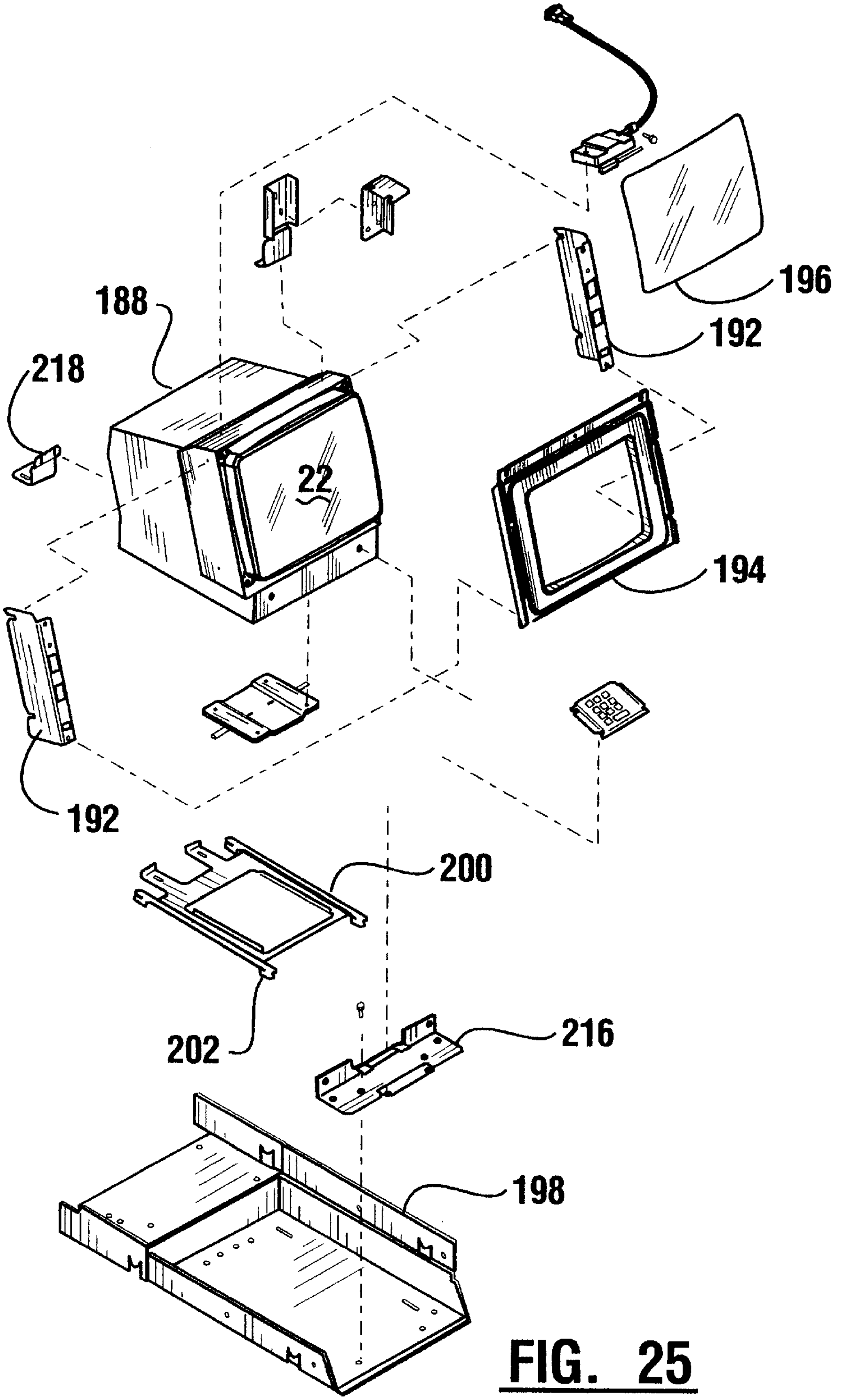
FIG. 25 is an exploded isometric view of the monitor and mounting system associated therewith.

A monitor 188 for installation in the ATM is shown in FIG. 21. The monitor includes the screen 22 which is part of the ATM's graphical user interface with the customer. For purposes of providing a gap-free enclosure between the monitor 188 and the fascia, a monitor surround assembly 190 is installed on the front of the monitor. As best shown in FIG. 25, the monitor surround assembly is comprised of a pair of side pieces 192 which attach to opposed surfaces on the sides of monitor 188 by fasteners, as well as a front plate 194.

The side plates and front plate include slotted openings which enable the adjustable mounting of the monitor surround assembly on the monitor. This facilitates adjustment of the surround assembly to enable the front plate to mate precisely with the adjacent fascia. As shown in FIG. 25, the monitor surround assembly may also include an anti-glare lens which provides for better viewing of the screen 22 as well as for protection of the monitor against vandalism.

Figure 27:
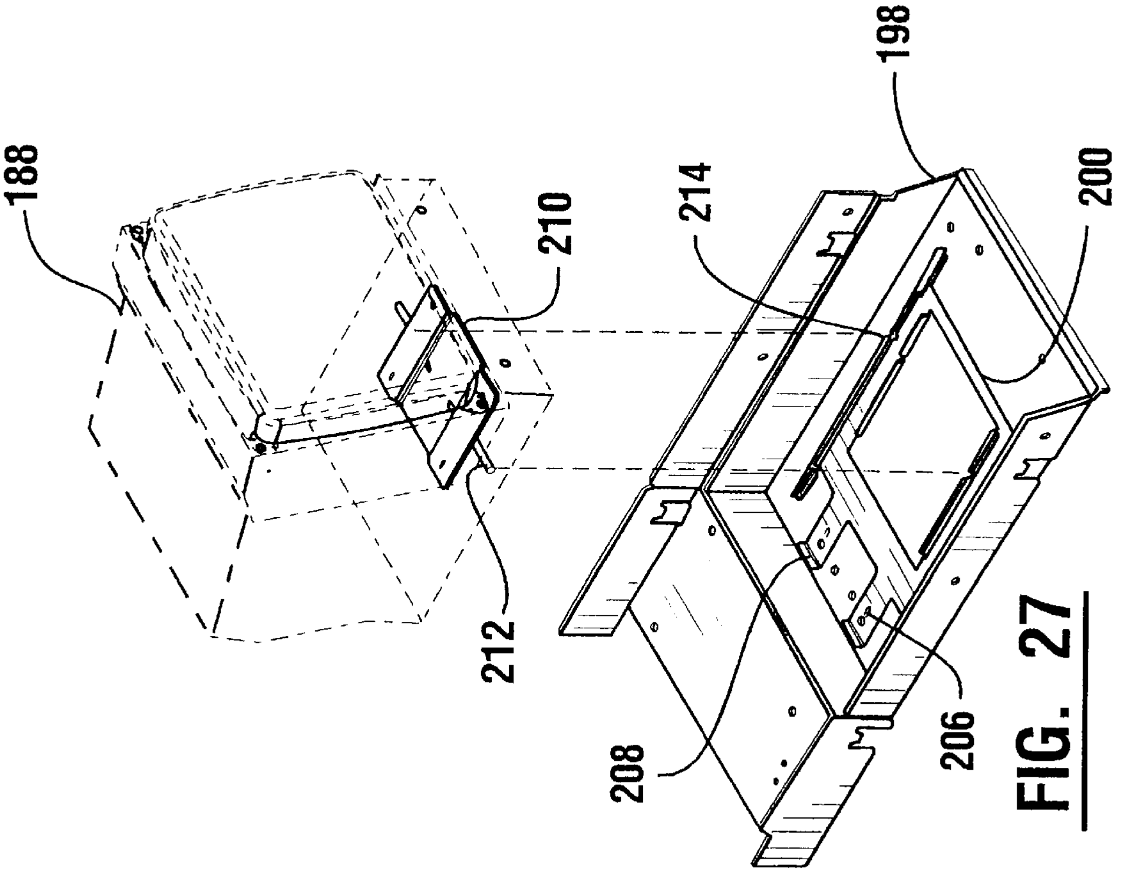
FIG. 27 is an isometric partial phantom view of the bottom tray and swivel bracket assembly of the monitor mounting mechanism.
Figure 26:
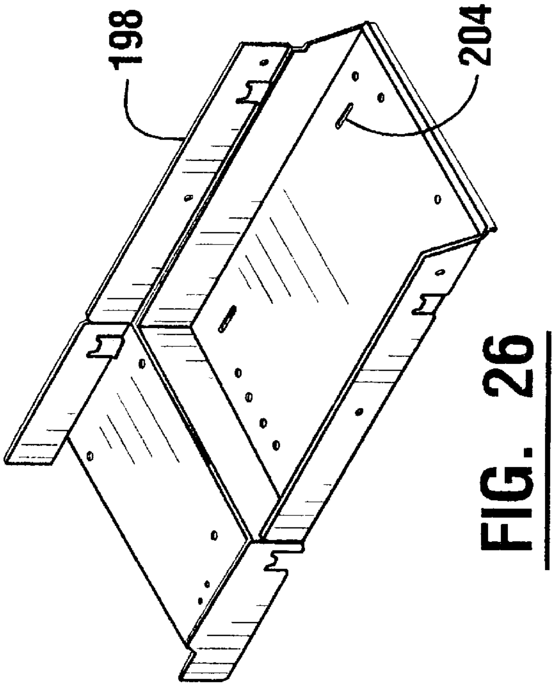
FIG. 26 is an isometric view of the bottom tray of the mounting system shown in FIG. 25.

The monitor mounting assembly further includes a lower tray 198 as shown in FIGS. 25 and 26. A bottom slide bracket 200 is installed on a base surface 197 in the front of tray 198. As shown in FIG. 25, the slide bracket includes downward extending projections 202 which ride in slots 204 extending along a first direction in the base surface of the tray. Slide bracket 200 includes a pair of spaced arms having slotted openings 206 therein for fastening the slide bracket to the tray, as well as tabs 208 which help guide movement of the slide bracket back and forth along the first direction. An upper pivot bracket 210 is mounted to the bottom of monitor 188 by fasteners as shown in FIG. 27. The upper pivot bracket 210 is mounted above an opening in the slide bracket and includes a shaft 212 extending therethrough. Shaft 212 has shaft portions on opposed sides which nest in slots 214 in two support projections 215 on each side of the opening in the lower slide bracket. This mounting enables the upper pivot bracket to pivot thereon. As a result, monitor 188 is enabled to be tilted through a range of angular positions.

Figure 28:
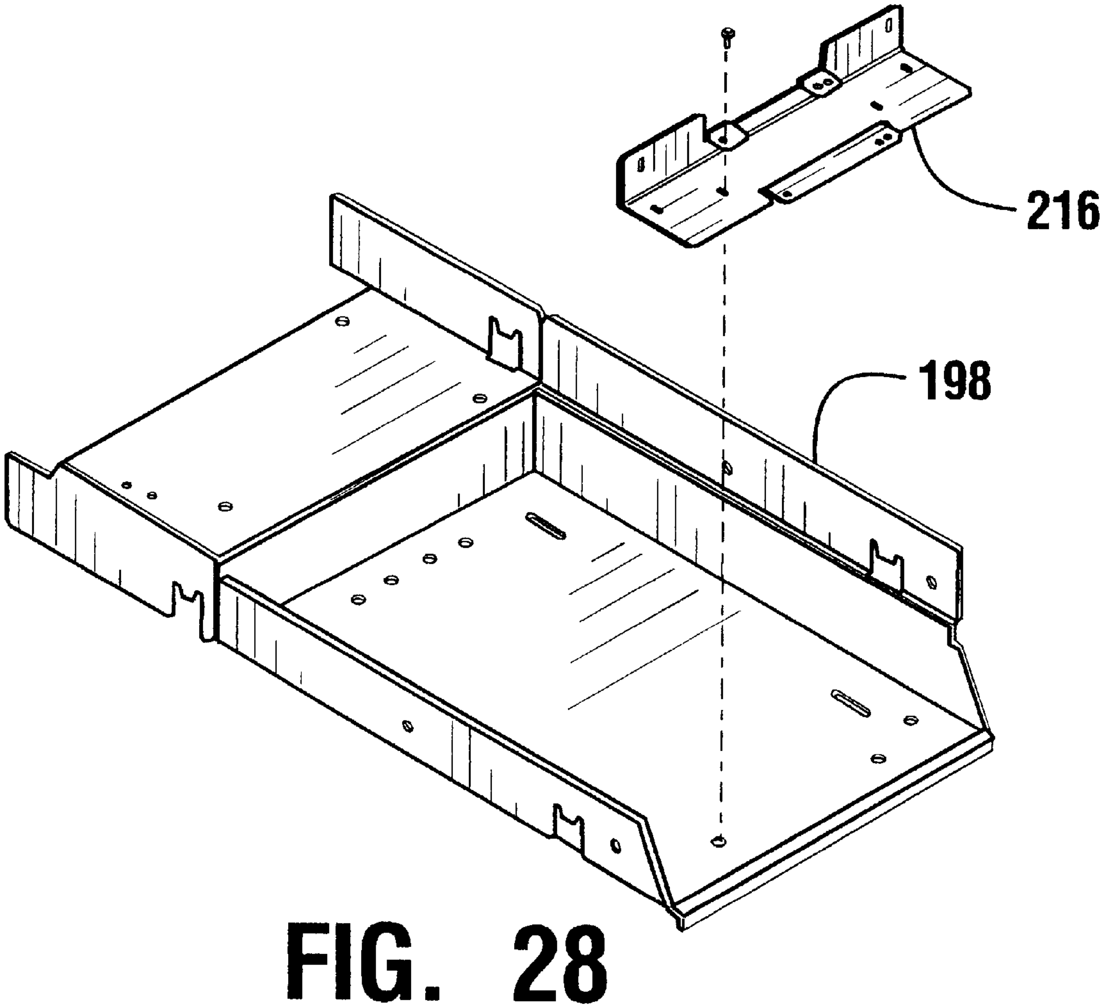
FIG. 28 is an isometric view of the bottom tray and front mounting bracket for mounting the monitor.
Figure 30:
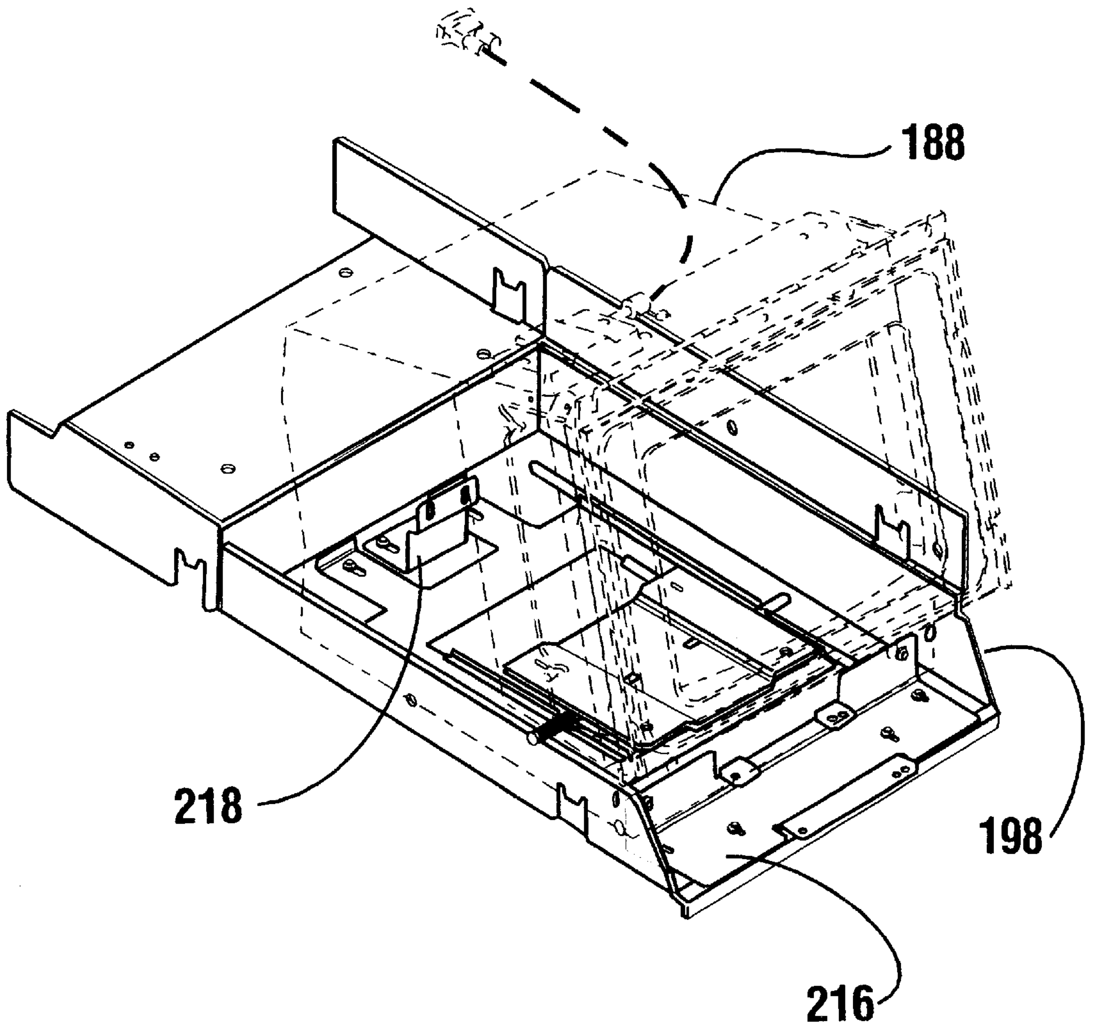
FIG. 30 is an isometric partial phantom view of the monitor mounting assembly.

The monitor mounting assembly further includes a front locking bracket 216 which is best shown in FIG. 28. Front bracket 216 is mounted toward the front edge of tray 198 by fasteners as shown. As best shown in FIG. 30, front bracket 216 includes slotted openings both for the fasteners that attach to tray 198 as well as to the front of monitor 188. As a result, the front bracket is enabled to hold the monitor through the range of tilted positions.

Figure 29:
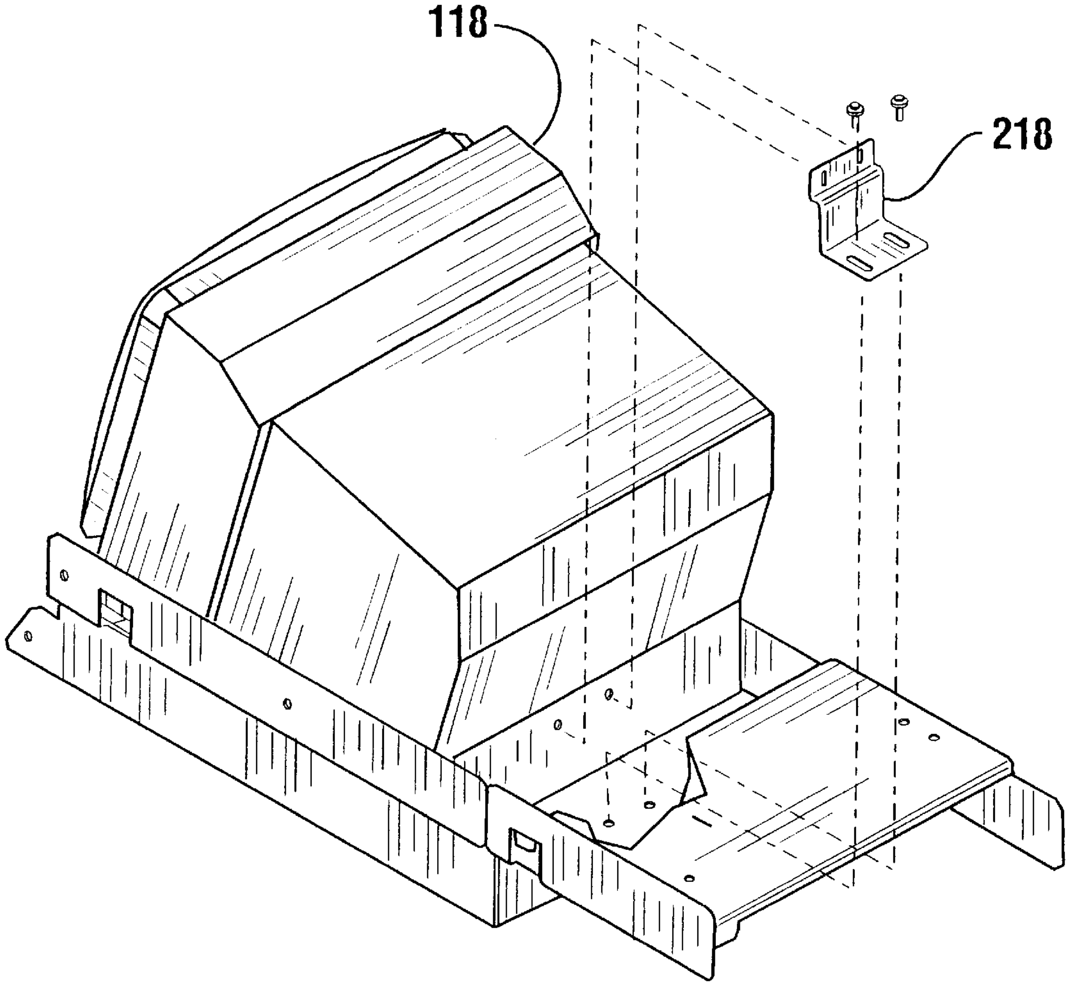
FIG. 29 is a rear isometric view showing the back mounting bracket for the monitor.

The mounting assembly further includes a rear locking bracket 218. The rear bracket preferably extends between the arms on the slide bracket. As best shown in FIG. 29, rear bracket 218 includes a pair of vertical slots for mounting the bracket to monitor 188 as well as a pair of horizontally extending slots for mounting the bracket to tray 198. This further enables the monitor to be held in a plurality of tilted positions. Monitor 188 includes a cable connector bracket 220 which connects to a cable as shown for providing the signals that drive monitor 188.

The monitor mounting assembly of the present invention enables the monitor to be moved forward and backward within tray 198 by manual movement of tabs 208 on the lower slide bracket 200. Further, monitor 188 may be tilted to the desired angle by tilting of the upper pivot bracket on the lower slide bracket. Fasteners extending through the front bracket 216 and rear bracket 218 are secured to hold monitor 188 in the desired position. Any gaps between the front plate of the monitor surround assembly 190 and the fascia of the ATM may be eliminated by adjustment of the monitor surround assembly on the monitor. As a result, monitor 188 may be oriented as desired to provide alignment between the monitor and the fascia.

The tray 198 enables the entire monitor adjustment assembly to be mounted inside the ATM in a manner similar to tray 46 so that the monitor may be pulled out of the enclosure of the ATM for purposes of alignment or servicing and then returned to the interior of the housing. Alternatively, the tray 198 may be fastened in a fixed position within the ATM enclosure at the time of ATM assembly.

The ATM of the present invention has advantages in terms of providing a compact and serviceable unit. The ATM further achieves through its modular housing and component construction a design that may be readily adapted to front load or rear load configuration as required for a lobby or through-the-wall installation.

Thus, the new automated teller machine of the present invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given are by way of examples and the invention is not limited to the exact details shown and described.

Further in the following claims any feature described as a means for performing a function shall be construed as encompassing any means capable of performing the function, and not merely the means used in a foregoing described embodiment or mere equivalents.

Having described the features, discoveries and principles of the invention, the manner in which it is constructed and operated, and the advantages and useful results attained; the new and useful structures, devices, elements, arrangements, parts, combinations, systems, equipment, operations and relationships are set forth in the appended claims.

We claim:

1. A method of servicing an automated banking machine, wherein the machine includes a generally rectangular enclosure having a pair of spaced side walls and a top wall, the enclosure having a front opening and a rear opening defined by the walls; a secure chest, the enclosure positioned above the secure chest; a service door for selectively opening and closing a first one of the openings; a permanent cover generally closing the other of the openings, wherein one of either said permanent cover or said service door includes a screen opening; at least one movable tray movably mounted above the secure chest, wherein the movable tray is in supporting connection with a slide bracket and a pivot bracket, and wherein the slide bracket and pivot bracket are in supporting connection with a monitor having a screen; comprising the steps of:

opening the service door to open the first opening of the enclosure;

extending the movable tray through the first opening;

moving said slide bracket in a first direction in guided relation with a guide, wherein said first direction is generally in lineal alignment with said screen opening when said one permanent cover or service door having said screen opening is in closing relation with its respective opening, whereby said screen is enabled to be moved to a desired position adjacent said screen opening;

moving said pivot bracket in a rotational direction to tilt said screen, whereby said screen is enabled to be in angular alignment with said screen opening.

2. A method of servicing an automated banking machine, wherein the machine includes a generally rectangular enclosure having a pair of spaced side walls and a top wall, the enclosure having a front opening and a rear opening defined by the walls; a secure chest, the enclosure positioned above the secured chest; a service door for selectively opening and closing a first one of the openings; a permanent cover generally closing the other of the openings; wherein one of the cover or the service door comprises a fascia of the banking machine; at least one movable tray movably mounted above the secure chest, wherein the movable tray supports at least one serviceable component thereon;

the steps including:

opening the service door to open the first opening of the enclosure;

extending the movable tray through the first opening; and servicing the component supported on the extended tray.

3. The method according to claim 2 and further comprising the steps of:

returning the movable tray to the enclosure so said tray no longer extends through the first opening; and closing the service door.

4. The method according to claim 3 wherein the serviceable component comprises a receipt printer, wherein the fascia has an opening therein, and after the closing step further comprising the step of delivering a receipt through said fascia opening from said printer.

5. The method according to claim 3 wherein the fascia includes a screen access opening, and wherein the serviceable component supported on tray is a monitor having a screen, and after the closing step further comprising the step of viewing the monitor screen through the screen access opening in the fascia.

6. The method according to claim 2 wherein the service door comprises a fascia of the banking machine, wherein the fascia includes a screen access opening, and wherein the servicing step is carried out by a technician having a head, and wherein during the servicing step the head of the technician extends in the screen access opening.

7. The method according to claim 2 wherein the service door comprises a fascia of the banking machine, said fascia pivotally mounted about a top portion of the fascia, and wherein the servicing step is carried out by a technician positioned below the fascia.

8. The method according to claim 2 wherein the secure chest includes an access door for gaining access thereto, and further comprising the step of opening the access door of the secure chest.

9. A method of servicing an automated banking machine comprising a plurality of steps, wherein the machine includes a generally rectangular enclosure having a pair of spaced side walls and a top wall, the enclosure having a front opening and a rear opening defined by the walls; a secure chest, the enclosure positioned above the secure chest; a service door for selectively opening and closing a first one of the openings; a permanent cover generally closing the other of the openings; at least one movable tray movably mounted above the secure chest, wherein the movable tray supports at least one serviceable component thereon; the steps including:

opening the service door to open the first opening of the enclosure;

extending the movable tray through the first opening; and servicing the component supported on the extended tray, wherein the servicing step is conducted by a technician positioned in an area defined by an intersection of;

(a) a projection from the enclosure in a first direction, wherein the tray extends from the enclosure in the first direction after the extending step, and (b) a projection from the tray after the tray is extended in the extending step, in a direction that is both generally horizontal and normal to the first direction.

10. A method of servicing an automated banking machine comprising a plurality of steps, wherein the machine includes a generally rectangular enclosure having a pair of spaced side walls and a top wall, the enclosure having a front opening and a rear opening defined by the walls; a secure chest, the enclosure positioned above the secure chest; a service door for selectively opening and closing a first one of the openings; a permanent cover generally closing the other of the openings; at least one movable tray movably mounted above the secure chest, wherein the tray is generally about one-half a width of the enclosure between the side walls and supports at least one serviceable component thereon;

the steps including:

opening the service door to open the first opening of the enclosure;

extending the movable tray through the first opening;

servicing the component supported on the extended tray.

11. A method of servicing an automated banking machine comprising a plurality of steps, wherein the machine includes a generally rectangular enclosure having a pair of spaced side walls and a top wall, the enclosure having a front opening and a rear opening defined by the walls; a secure chest, the enclosure positioned above the secure chest; a service door for selectively opening and closing a first one of the openings; a permanent cover generally closing the other of the openings; a first movable tray movably mounted above the secure chest, wherein the movable tray supports at least one serviceable component thereon; a second movable tray movably mounted above the secure chest, wherein the second tray has at least one second serviceable component thereon, and wherein the second tray is independently movable relative to the first tray, and wherein the first and second trays are positioned in generally side by side relation when in said enclosure; the steps including:

opening the service door to open the first opening of the enclosure;

extending the first movable tray through the first opening;

servicing the component supported on the extended first tray;

extending the second movable tray through the first opening;

servicing the second component on the extended second tray.

12. A method of servicing an automated banking machine comprising a plurality of steps, wherein the machine includes a generally rectangular enclosure having a pair of spaced side walls and a top wall, the enclosure having a front opening and a rear opening defined by the walls; a secure chest, the enclosure positioned above the secure chest; a service door for selectively opening and closing a first one of the openings; a permanent cover generally closing the other of the openings; a first movable tray movably mounted above the secure chest, wherein the movable tray supports at least one serviceable component thereon; a second movable tray movably mounted above the secure chest, wherein the second tray has at least one second serviceable component thereon, and wherein the second tray is independently movable relative to the first tray, and wherein the first tray and the second tray are positioned in generally side-by-side relation when in said enclosure; the steps including:

opening the service door to open the first opening of the enclosure;

extending the first movable tray through the first opening;

servicing the component supported on the extended first tray;

returning the first movable tray to the enclosure so said first tray no longer extends through the first opening;

extending the second movable tray through the first opening;

servicing the second component supported on the second tray.

13. The method according to claim 12 wherein the step of servicing the second component is conducted by a technician positioned in an area previously occupied by the first tray when the first tray was extended through the opening.

14. The method according to claim 12 wherein the step of servicing the first component on the first extending tray is conducted by a technician positioned in an area, wherein the area is occupied by the second tray when the second tray is extended through the opening.

15. A method of servicing an automated banking machine comprising a plurality of steps, wherein the machine includes a generally rectangular enclosure having a pair of spaced side walls and a top wall, the enclosure having a front opening and a rear opening defined by the walls; a secure chest, the enclosure positioned above the secure chest; a service door for selectively opening and closing a first one of the openings, wherein the service door comprises a fascia of the banking machine, and wherein the fascia is pivotally mounted about a top portion thereof; a permanent cover generally closing the other of the openings; at least one movable tray movably mounted above the secure chest, wherein the movable tray supports at least one serviceable component thereon;

the steps including:

opening the service door to open the first opening of the enclosure;

extending the movable tray through the first opening, wherein the movable tray is extended below the fascia; and servicing the component supported on the extended tray.

16. A method of servicing an automated banking machine comprising a plurality of steps, wherein the machine includes an enclosure having an interior area, an opening to the interior area, a service door for selectively opening and closing the opening, a first tray movably mounted in supported connection with the enclosure in the interior area, the first tray having a first serviceable component supported thereon, a second tray movably mounted in supported connection with the enclosure in the interior area, the second tray having a second serviceable component supported thereon, the second tray independently movable of the first tray and positioned generally transversely adjacent thereto, the steps including:

opening the service door to open the opening of the enclosure;

extending the first tray in a first direction through the opening;

servicing the first component on the extended first tray, wherein the servicing step is carried out by a technician positioned in a first area defined by a projection in the first direction from the second tray when said second tray is positioned in the enclosure.

17. The method according to claim 16 and further comprising the steps of:

returning the first tray to the enclosure; and the technician then moving from the first area to a second area, the second area previously occupied by the first tray when the first tray was extended from the enclosure.

18. The method according to claim 17 and further comprising the steps of:

extending the second tray in the first direction to extend through the opening; and servicing the second component supported on the second tray, wherein the step of servicing the second component is carried out by the technician positioned in the second area.

19. The method according to claim 18 and further comprising the steps of returning the second tray to the enclosure, and the technician moving out of the first and second areas, and closing the service door.

20. The method according to claim 16 wherein the machine further comprises a secure chest, and wherein the first and second trays are movably mounted above the secure chest, wherein in the extending step the first tray extends above the secure chest.

21. The method according to claim 20 wherein the secure chest includes an access door for gaining access thereto, and further comprising the step of opening the access door of the secure chest.

22. A method of servicing an automated banking machine, comprising a plurality of steps, and wherein the machine includes a generally rectangular enclosure having a pair of spaced side walls and a top wall, the enclosure having a front opening and a rear opening defined by the walls; a secure chest, the enclosure positioned above the secure chest; a service door for selectively opening and closing a first one of the openings; a cover generally closing the other of the openings; wherein one of the cover or the service door comprises a fascia of the banking machine; at least one movable tray movably mounted above the secure chest, wherein the movable tray supports at least one serviceable component thereon; the steps including:

opening the service door to open the first opening of the enclosure;

extending the movable tray through the first opening; and servicing the component supported on the extended tray.

* * * * *